United States Patent
Khandekar et al.

(10) Patent No.: US 8,705,419 B2
(45) Date of Patent: Apr. 22, 2014

(54) SUBFRAME STAGGERING FOR RELAY COMMUNICATION

(75) Inventors: Aamod Dinkar Khandekar, San Diego, CA (US); Tingfang Ji, San Diego, CA (US); Dexu Lin, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 12/899,862

(22) Filed: Oct. 7, 2010

(65) Prior Publication Data

US 2011/0249611 A1   Oct. 13, 2011

Related U.S. Application Data

(60) Provisional application No. 61/250,223, filed on Oct. 9, 2009.

(51) Int. Cl.
*H04B 7/00*     (2006.01)
*H04W 16/24*    (2009.01)
*H04W 16/18*    (2009.01)
*H04W 92/04*    (2009.01)

(52) U.S. Cl.
CPC ............ *H04W 16/24* (2013.01); *H04W 16/18* (2013.01); *H04W 92/04* (2013.01)
USPC ...................................................... 370/310

(58) Field of Classification Search
CPC ...... H04W 16/24; H04W 16/18; H04W 92/04
USPC ......... 370/310, 312, 315, 327–330, 343, 345, 370/347–249
See application file for complete search history.

(56) References Cited

U.S. PATENT DOCUMENTS 8,228,853 B2    7/2012  Ji et al.
8,576,900 B2 *  11/2013 Kim et al. ............. 375/222
(Continued)

FOREIGN PATENT DOCUMENTS

CN    1992922 A      7/2007
JP    2009528804 A   8/2009
(Continued)

OTHER PUBLICATIONS

Ericson, Text proposal to correct relaying text in TR36.912, R1-093722, 3GPP, Aug. 24-28, 2009, 3 pages.*

(Continued)

*Primary Examiner* — Dmitry H Levitan

(57) ABSTRACT

Techniques for supporting relay communication with subframe staggering are described. For subframe staggering, subframes of different relays are staggered from one another, which can increase the number of potential backhaul subframes. In one design, a first relay determines its access subframes and backhaul subframes, which correspond to different non-overlapping subsets of the subframes of the first relay. The first relay communicates with at least one UE during the access subframes and communicates with a base station during the backhaul subframes. The subframes of the first relay are offset from the subframes of a second relay communicating with the base station. In one design, the access subframes of the first relay includes all subframes with either even or odd indices, which can support data transmission with HARQ. In one design, at least one access subframe corresponds to at least one reserved subframe having reduced transmit power from the base station.

54 Claims, 13 Drawing Sheets

(56) References Cited

U.S. PATENT DOCUMENTS

| | | | | |
|---|---|---|---|---|
| 2009/0075588 | A1* | 3/2009 | Zhu et al. | 455/18 |
| 2009/0129332 | A1 | 5/2009 | Dayal et al. | |
| 2010/0008282 | A1* | 1/2010 | Bhattad et al. | 370/312 |
| 2010/0281323 | A1* | 11/2010 | Wang et al. | 714/748 |
| 2011/0080896 | A1* | 4/2011 | Krishnamurthy et al. | 370/336 |
| 2011/0080962 | A1* | 4/2011 | Blankenship et al. | 375/259 |
| 2011/0267997 | A1* | 11/2011 | Seo et al. | 370/280 |

FOREIGN PATENT DOCUMENTS

| | | |
|---|---|---|
| JP | 2011511558 A | 4/2011 |
| WO | 2007100232 A1 | 9/2007 |
| WO | 2009097070 A1 | 8/2009 |

OTHER PUBLICATIONS

Motorola, Relay Backhaul design, R1-093414, 3GPP, Aug. 24-28, 2009, 4 pages.*

Motorola, Frame structure and signaling to support Relay operation, R1-091348, 3GPP, Mar. 23-27, 2009, 3 pages.*

Nokia, Improved Access-backhaul partition,R1-093309, 3GPP, Aug. 24-28, 2009, 5 pages.*

Ericsson et al: "Text proposal to correct relaying text in TR36.912", 3GPP Draft; R1-093722 {Inband Word), 3rd Generation Partnership Project (3GPP), Mobile Competence Centre ; 650, Route Des Lucioles ; F-06921 Sophia-Antipolis Cedex ; France, no. Shenzhen, China; 20090824, Aug. 24, 2009, XP050388240, [retrieved on Aug. 28, 2009] paragraphs [09.1], [09.2], [09.3].

International Search Report and Written Opinion—PCT/US2010/052185—International Search Authority, European Patent Office,Jan. 28, 2011.

Motorola: "Relay Backhaul Design", 3GPP Draft; R1-093414—Backhaul Design for Relays Vfinal, 3rd Generation Partnership Project (3GPP), Mobile Competence Centre ; 650, Route Des Lucioles ; F-06921 Sophia-Antipolis Cedex ; France, no. Shenzhen, China; Aug. 19, 2009, XP050351701, [retrieved on Aug. 19, 2009] p. 2, line 1-line 29.

Nokia et al: "Improved Access-backhaul Partition Scheme for TDD Relay", 3GPP Draft; R1-093309-Improved Access-Backhaul Partition Scheme for TDD Relay, 3RD Generation Partnership Project (3GPP), Mobile Competence Centre ; 650, Route Des Lucioles ; F-06921 Sophia-Antipolis Cedex ; France, no. Shenzhen, China; Aug. 18, 2009, XP050351633, [retrieved on Aug. 18, 2009].

Huawei: "Backhaul multiplexing for type 1 relays", 3GPP TSG RAN WG1 meeting #57 R1-091801, 3GPP, Mar. 8, 2009.

* cited by examiner

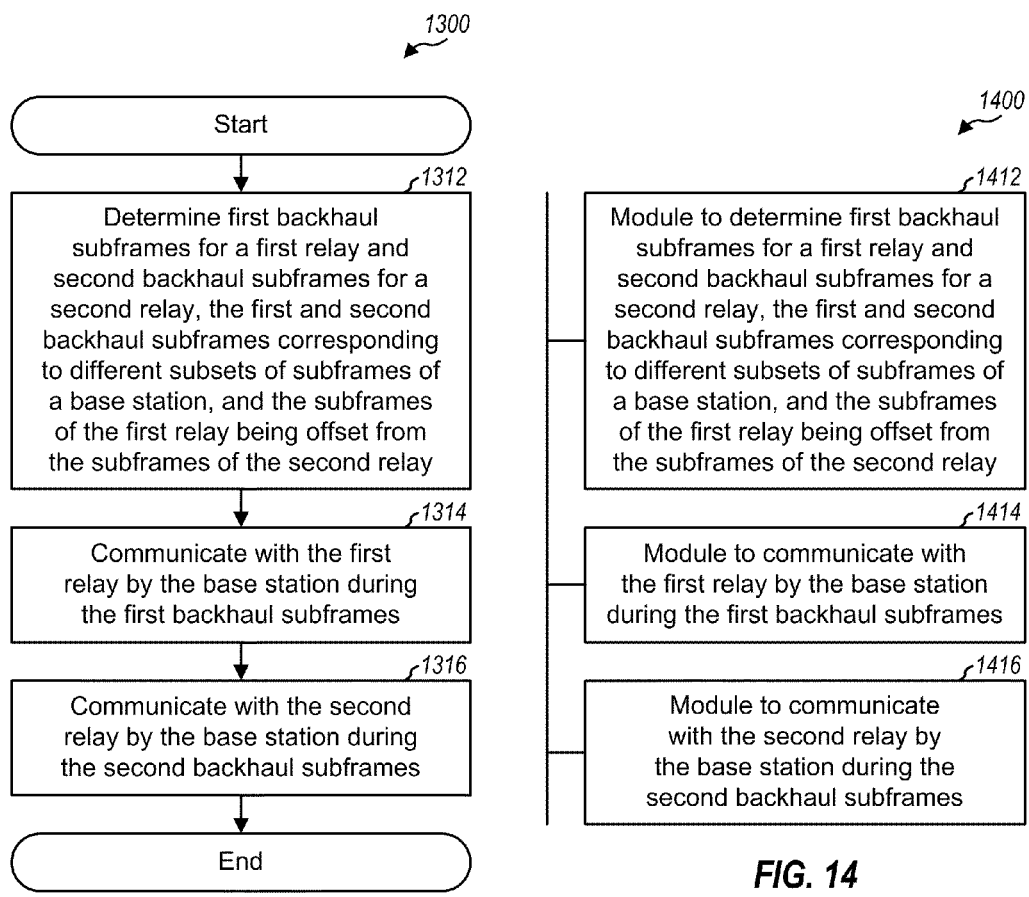

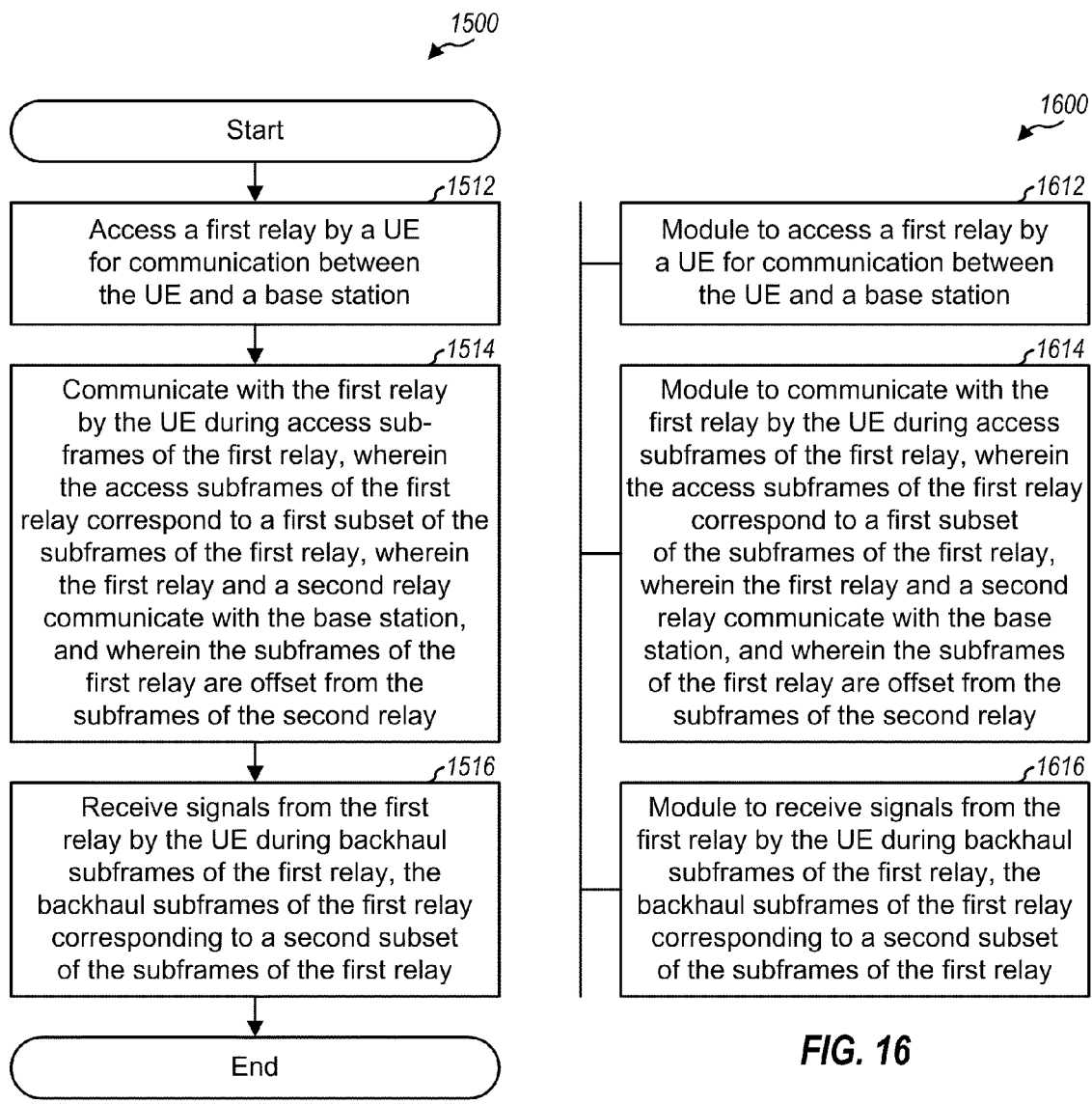

SUBFRAME STAGGERING FOR RELAY COMMUNICATION

The present application claims priority to provisional U.S. Application Ser. No. 61/250,223, entitled "Relay Clustering with Staggered Subframes," filed Oct. 9, 2009, assigned to the assignee hereof and incorporated herein by reference.

BACKGROUND

I. Field

The present disclosure relates generally to communication, and more specifically to techniques for supporting operation of relays in wireless communication networks.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless network may include a number of base stations that can support communication for a number of user equipments (UEs). The wireless network may also include relays that can improve the coverage and capacity of the wireless network without the need for a potentially expensive wired backhaul link. A relay may be a "decode and forward" station that may receive a signal from an upstream station (e.g., a base station), process the received signal to recover data sent in the signal, generate a relay signal based on the recovered data, and transmit the relay signal to a downstream station (e.g., a UE).

A relay may communicate with a base station on a backhaul link and may appear as a UE to the base station. The relay may also communicate with one or more UEs on an access link and may appear as a base station to the UE(s). The relay may be a half-duplex relay that cannot transmit and receive at the same time on the same frequency channel. Hence, the backhaul link and the access link may be time division multiplexed. Furthermore, the wireless network may have certain requirements that may impact the operation of the relay. It may be desirable to support efficient operation of the relay in light of its transmit/receive limitations as well as other network requirements.

SUMMARY

Techniques for supporting operation of relays in wireless networks are described herein. In an aspect, subframe staggering may be used to support relay communication. For subframe staggering, subframes of different relays may be staggered from one another, which may provide more flexible backhaul/access partitioning, enable better resource utilization, and/or provide other advantages.

In one design, a first relay may determine its access subframes and backhaul subframes, which may correspond to different non-overlapping subsets of subframes of the first relay. The first relay may communicate with at least one UE on the access link during the access subframes. The first relay may communicate with a base station on the backhaul link during the backhaul subframes. The subframes of the first relay may be offset (e.g., by an integer number of subframes) from the subframes of a second relay communicating with the base station.

In general, the subframes of the first relay may be offset from the subframes of any number of relays by any number of different offsets. Each relay may have a respective set of potential backhaul subframes in which that relay is able to communicate with the base station. A superset of all potential backhaul subframes for all relays may be increased due to the offsets between the subframes of different relays. The increased number of potential backhaul subframes may improve backhaul capacity, as described below.

In one design, the set of potential backhaul subframes for the first relay may include all subframes that can be configured as multicast/broadcast single frequency network (MBSFN) subframes by the first relay. The backhaul subframes of the first relay may be selected from this set of potential backhaul subframes. The first relay may configure each backhaul subframe as an MBSFN subframe, or a blank subframe, or an almost blank subframe, or a subframe of some other type, so that the first relay can transmit as little as possible in each backhaul subframe.

In one design, the access subframes of the first relay may include either all subframes with odd indices or all subframes with even indices of the first relay. The first relay may receive data transmission sent with hybrid automatic retransmission (HARQ) by the at least one UE during the access subframes.

In one design, at least one of the access subframes of the first relay may correspond to at least one reserved subframe of the base station. Each reserved subframe may have reduced (e.g., low or no) transmit power from the base station to reduce interference to the at least one UE communicating with the first relay.

Various aspects and features of the disclosure are described in further detail below.

BRIEF DESCRIPTION OF THE DRAWINGS

FIGS. 13 and 14 show a process and an apparatus, respectively, for supporting communication by a base station.

FIGS. 15 and 16 show a process and an apparatus, respectively, for communicating by a UE.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
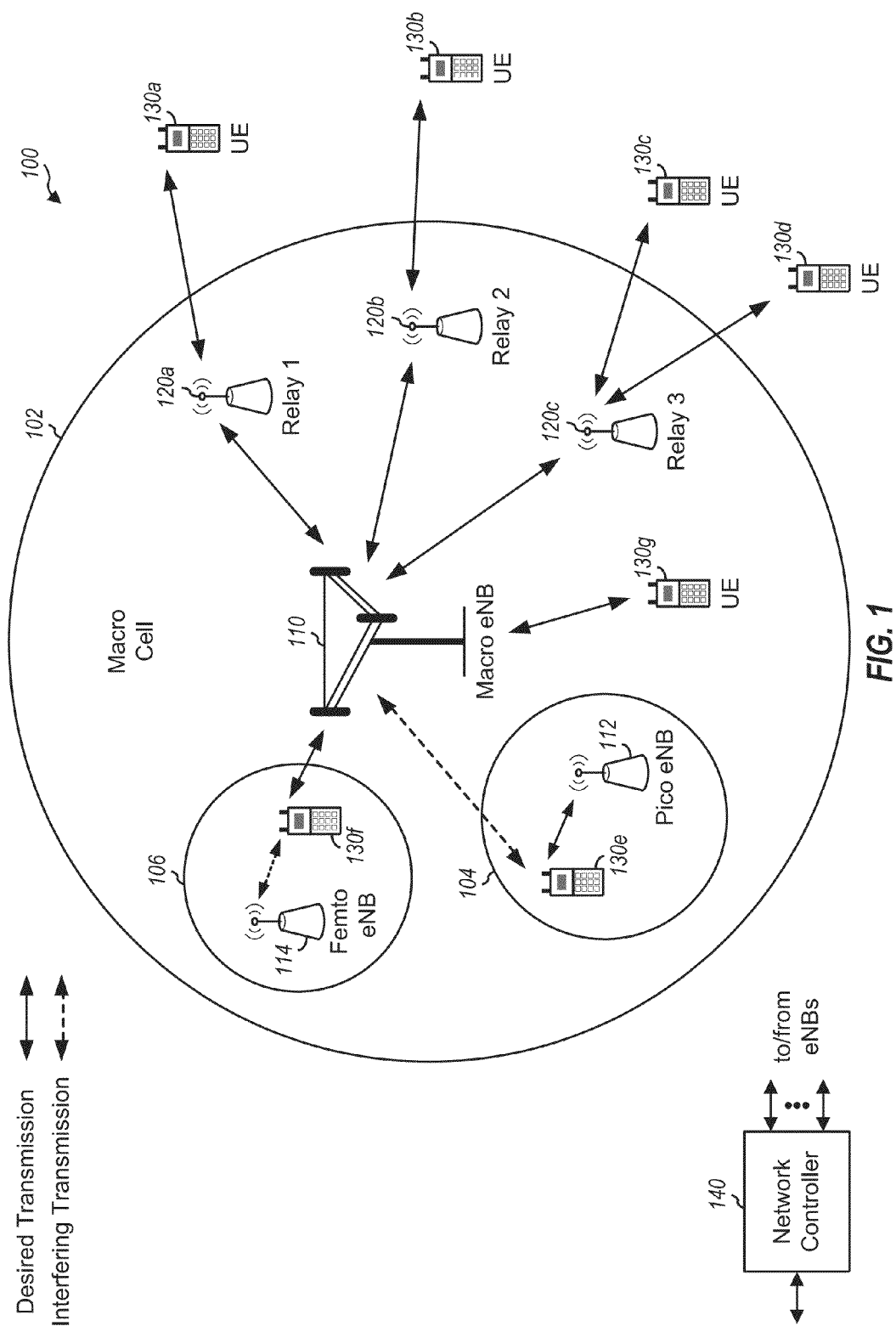
FIG. 1 shows a wireless communication network.

FIG. 1 shows a wireless communication network 100, which may be an LTE network or some other wireless network. Wireless network 100 may include a number of evolved Node Bs (eNBs), relays, and other network entities that can support communication for a number of UEs. An eNB may be an entity that communicates with the UEs and may also be referred to as a base station, a Node B, an access point, etc. An eNB may provide communication coverage for a particular geographic area. In 3GPP, the term "cell" can refer to a coverage area of an eNB and/or an eNB subsystem serving this coverage area, depending on the context in which the term is used. An eNB may support one or multiple (e.g., three) cells.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, wireless network 100 includes a macro eNB 110 for a macro cell 102, a pico eNB 112 for a pico cell 104, and a home eNB (HeNB) 114 for a femto cell 106. A network controller 140 may couple to a set of eNBs and may provide coordination and control for these eNBs.

A relay may be an entity that receives a transmission of data and/or other information from an upstream station (e.g., an eNB or a UE) and sends a transmission of the data and/or other information to a downstream station (e.g., a UE or an eNB). A relay may also be referred to as a relay station, a relay eNB, etc. A relay may also be a UE that relays transmissions for other UEs. In FIG. 1, relays 120a, 120b and 120c may communicate with eNB 110 and UEs 130a, 130b, 130c and 130d in order to facilitate communication between the eNB and the UEs.

UEs 130 may be dispersed throughout the wireless network, and each UE may be stationary or mobile. A UE may also be referred to as a terminal, an access terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, other UEs, etc.

Figure 2:
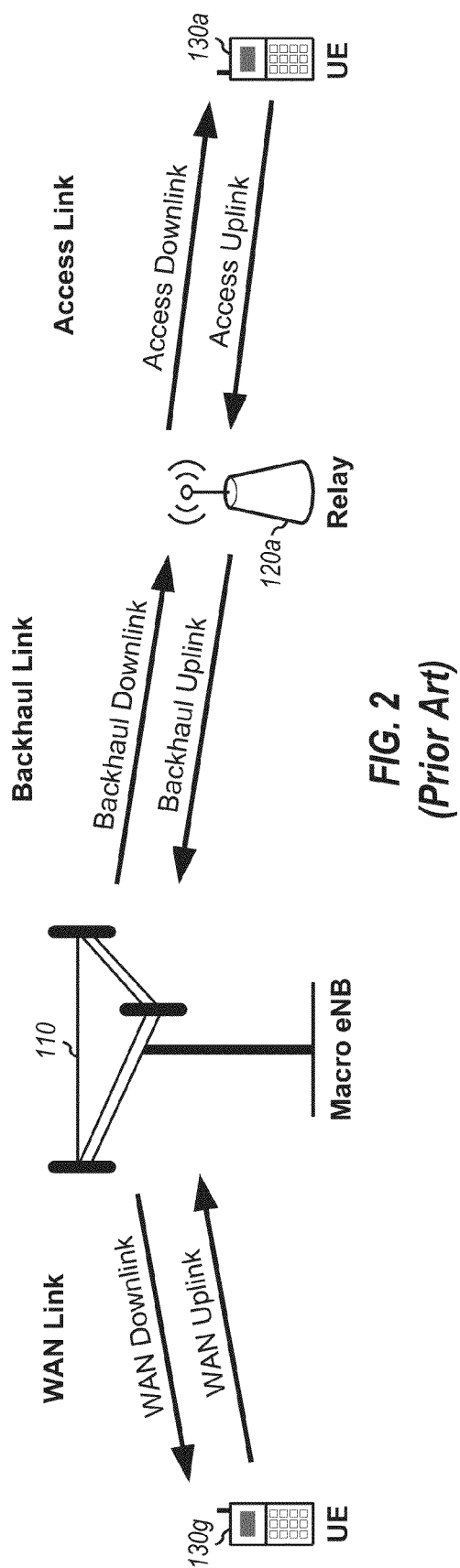
FIG. 2 shows communication between a base station and a UE via a relay.

FIG. 2 shows communication between macro eNB 110 and UE 130a via relay 120a. Relay 120a may communicate with macro eNB 110 via a backhaul link and may communicate with UE 130a via an access link. On the backhaul link, relay 120a may receive downlink transmission from eNB 110 via a backhaul downlink and may send uplink transmission to eNB 110 via a backhaul uplink. On the access link, relay 120a may send downlink transmission to UE 130a via an access downlink and may receive uplink transmission from UE 130a via an access uplink. eNB 110 may be referred to as a donor eNB for relay 120a.

FIG. 2 also shows direct communication between macro eNB 110 and a UE 130g. eNB 110 may send downlink transmission to UE 130g via a wide area network (WAN) downlink and may receive uplink transmission from UE 130g via a WAN uplink.

The wireless network may utilize frequency division duplexing (FDD) or time division duplexing (TDD). For FDD, the downlink and uplink are allocated separate frequency channels. Downlink transmission and uplink transmission may be sent concurrently on the two frequency channels. For TDD, the downlink and uplink share the same frequency channel. Downlink and uplink transmissions may be sent on the same frequency channel in different time intervals.

Figure 3:
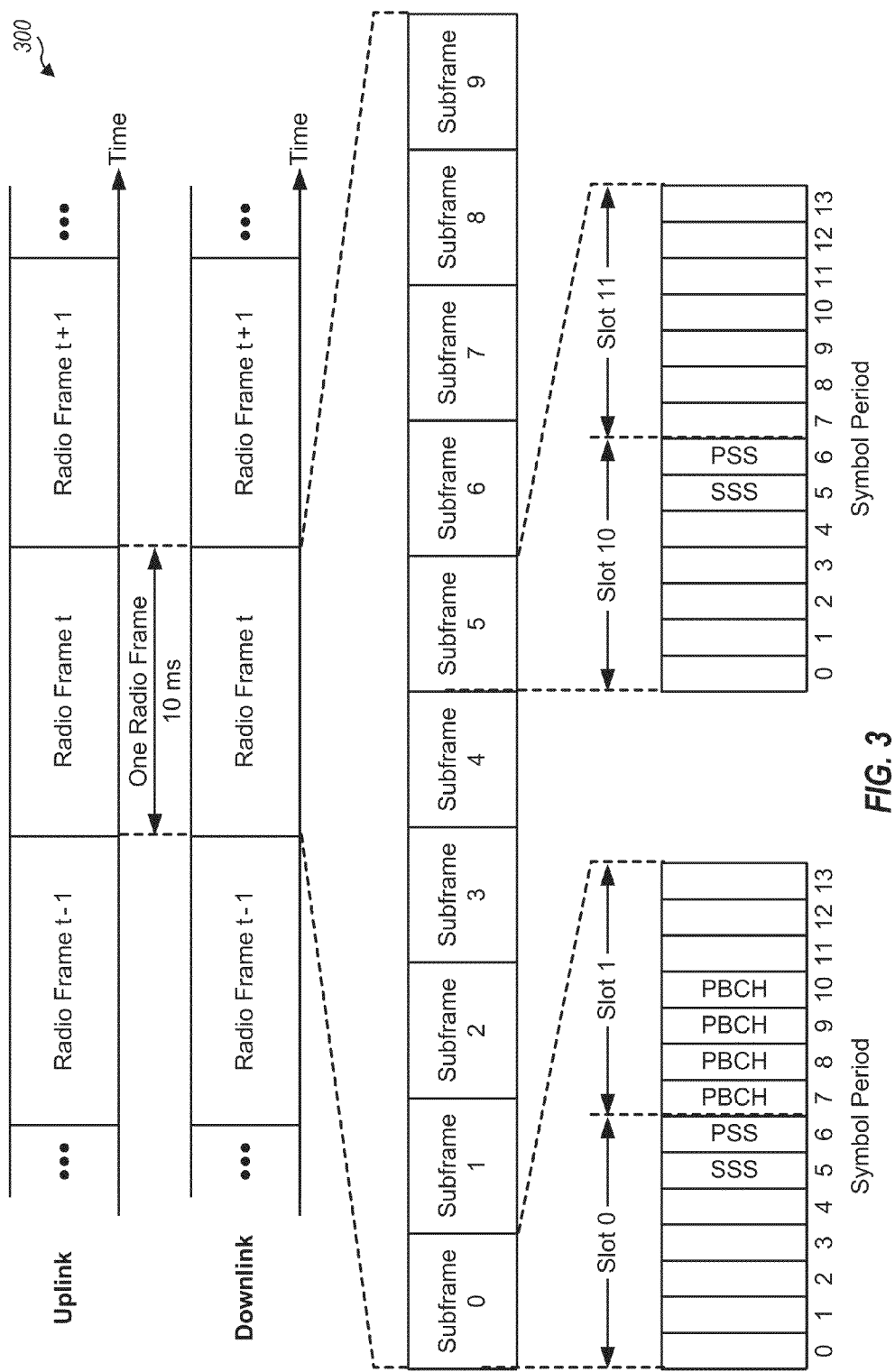
FIG. 3 shows an exemplary frame structure.

FIG. 3 shows a frame structure 300 used for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1.

On the downlink in LTE, an eNB may transmit a primary synchronization signal (PSS) and a secondary synchronization signal (SSS) in the center 1.08 MHz of the system bandwidth for each cell supported by the eNB. The PSS and SSS may be sent in symbol periods 6 and 5, respectively, in subframes 0 and 5 of each radio frame with the normal cyclic prefix, as shown in FIG. 2. The PSS and SSS may be used by the UEs for cell search and acquisition. The eNB may transmit a Physical Broadcast Channel (PBCH) in symbol periods 0 to 3 in slot 1 of subframe 0 in certain radio frames. The PBCH may carry some system information. The eNB may also transmit other channels and signals in each subframe.

LTE supports several subframe formats for the downlink. Each subframe format may be associated with certain characteristics, e.g., certain signals and channels being sent in a subframe of that format and/or a specific way in which a signal or channel is sent in the subframe. Subframes of different formats may be used for different purposes.

Figures 4, 5:
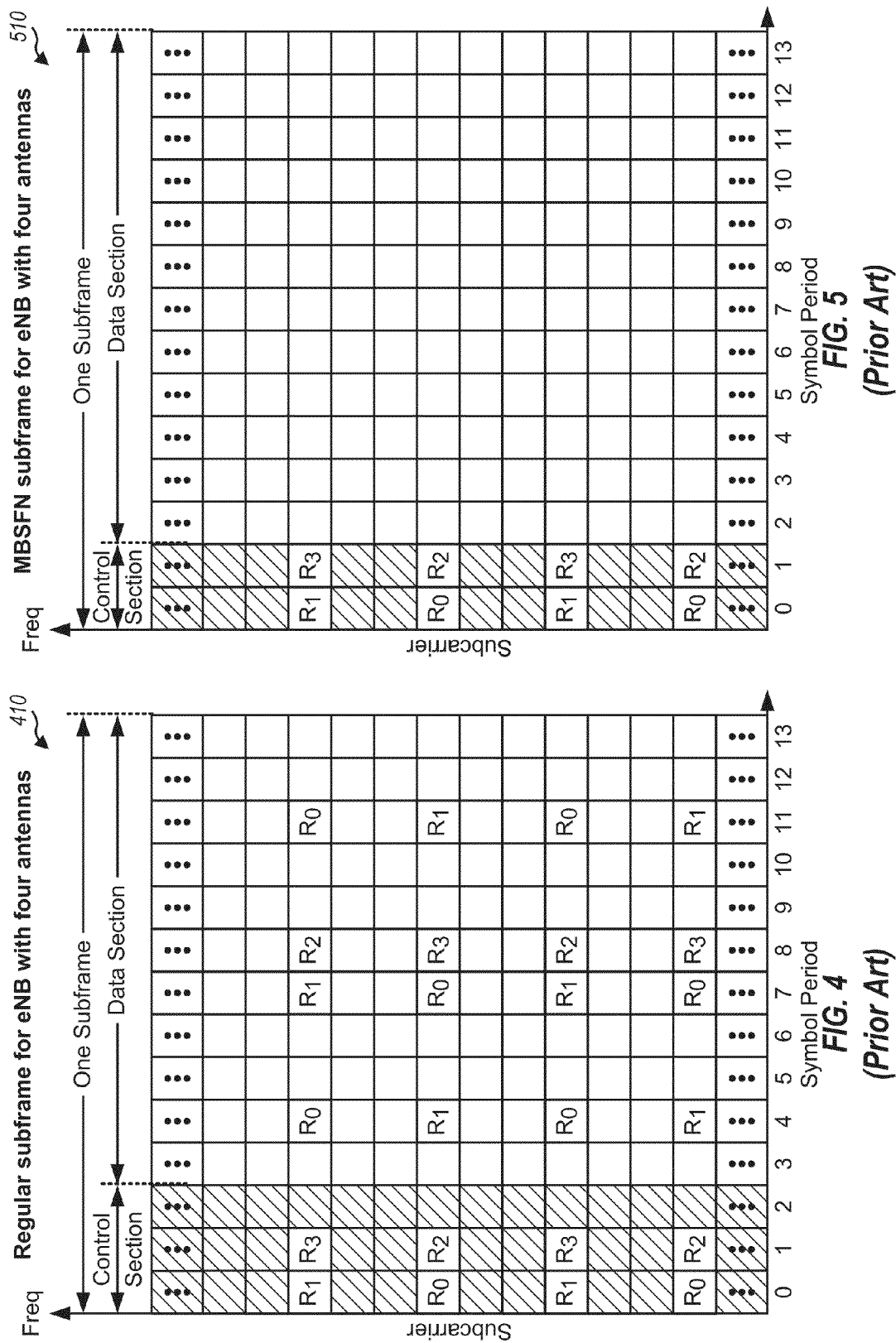
FIG. 4 shows a regular subframe format.
FIG. 5 shows an MBSFN subframe format.

FIG. 4 shows a regular subframe format 410 that may be used for the downlink in LTE. For the normal cyclic prefix, the left slot includes seven symbol periods 0 through 6, and the right slot includes seven symbol periods 7 through 13. Each slot includes a number of resource blocks. Each resource block covers 12 subcarriers in one slot and includes a number of resource elements. Each resource element covers one subcarrier in one symbol period and may be used to send one modulation symbol, which may be a real or complex value.

Subframe format 410 may be used by an eNB equipped with four antennas. A cell-specific reference signal (CRS) may be transmitted from antennas 0 and 1 in symbol periods 0, 4, 7 and 11 and from antennas 2 and 3 in symbol periods 1 and 8 of a regular subframe. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas.

A regular subframe may include a control section followed by a data section. The control section may include the first Q symbol periods of the subframe, where Q may be equal to 1, 2, 3 or 4. Q may change from subframe to subframe and may be conveyed in the first symbol period of the subframe. The control section may carry control information. The data section may include the remaining 2L-Q symbol periods of the subframe and may carry data and/or other information for UEs.

FIG. 5 shows an MBSFN subframe format 510 that may be used for the downlink in LTE. Subframe format 510 may be used by an eNB equipped with four antennas. A CRS may be transmitted from antennas 0 and 1 in symbol period 0 and from antennas 2 and 3 in symbol period 1 of an MBSFN subframe. In the example shown in FIG. 5, Q=2, the control section covers two symbol periods of the MBSFN subframe, and the data section covers the remaining symbol periods of the MBSFN subframe.

In general, an MBSFN subframe is a subframe that carries a limited reference signal and limited control information in the control section of the subframe and may or may not carry multicast/broadcast data in the data section of the subframe. A station (e.g., an eNB or a relay) may declare a subframe as an MBSFN subframe (e.g., via system information) to UEs. These UEs may then expect the reference signal and control information in the control section of the MBSFN subframe. The station may separately inform a UE (e.g., via upper layer signaling) to expect broadcast data in the data section of the MBSFN subframe, and the UE would then expect broadcast data in the data section. The station may elect to not inform any UE to expect broadcast data in the data section of the MBSFN subframe, and the UEs would not expect broadcast data in the data section. These characteristics of the MBSFN subframe may be exploited to support relay operation, as described below.

FIGS. 4 and 5 show two subframe formats that may be used for the downlink. Other subframe formats may also be supported. For example, a blank subframe format and/or an almost blank subframe format may be supported. A blank subframe may include no transmission in the entire subframe. An almost blank subframe may include the CRS transmitted across the entire subframe, control information transmitted in the control section, but no data in the data section.

As shown in FIG. 1, relays may be deployed in the wireless network in order to improve network capacity and enhance network coverage. These relays may typically be half-duplex relays, which may be a preferred deployment choice because of their simplicity and low cost. As noted above, half-duplex relays are typically not able to transmit and receive on the same frequency band at the same time. These relays may communicate with their donor eNBs on the backhaul link and with their UEs on the access link via separate resources. For TDD relaying, the backhaul link and the access link for the relays may be multiplexed in time. For example, on the downlink, some available subframes for the downlink may be used for the backhaul downlink, and some other available subframes for the downlink may be used for the access downlink. On the uplink, some available subframes for the uplink may be used for the backhaul uplink, and some other available subframes for the uplink may be used for the access uplink. A backhaul/access partitioning may be defined for the downlink and may indicate which subframes are used for the backhaul downlink and which subframes are used for the access downlink. Similar, a backhaul/access partitioning may be defined for the uplink and may indicate which subframes are used for the backhaul uplink and which subframes are used for the access uplink. To simply operation, the backhaul/access partitioning for the uplink may be equal to the backhaul/access partitioning for the downlink but delayed by a certain number of subframes (e.g., four subframes). In the description below, a backhaul/access partitioning may be for either the downlink or uplink. A subframe used for the backhaul link may be referred to as a backhaul subframe, and a subframe used for the access link may be referred to as an access subframe.

In one common implementation of TDD relaying, a donor eNB and all of its served relays utilize the same backhaul/access partitioning, which may be referred to as a no-staggering scheme. For example, the periodicity of the backhaul/access partitioning for the downlink may be N subframes, M subframes may be used as backhaul subframes for the relays to listen to the donor eNB on the backhaul downlink, and N-M subframes may be used as access subframes for the relays to transmit to their UEs on the access downlink.

In general, it may be desirable for a relay to transmit as little as possible in each backhaul subframe in order to spend as much time as possible to listen to its donor eNB. To facilitate this, a backhaul subframe may be implemented with an MBSFN subframe, or a blank subframe, or an almost blank subframe, or a subframe of some other type. By using any one of these non-regular subframes for the backhaul subframe, the relay may be able to cease transmission in all or most of the backhaul subframe so that it can listen to its donor eNB. For clarity, the use of MBSFN subframes for backhaul subframes is described below.

A relay may realize its backhaul subframes by configuring certain subframes to be MBSFN subframes. In each MBSFN subframe, the relay may transmit the CRS and control information in the first one or two symbol periods of the subframe (e.g., as shown in FIG. 5) and may listen to its donor eNB in the remaining symbol periods of the subframe. In LTE Release 8, subframes 0, 4, 5 and 9 of each radio frame cannot be configured as MBSFN subframes in FDD, and subframes 0, 1, 5 and 6 of each radio frame cannot be configured as MBSFN subframes in TDD. For clarity, much of the description below is for FDD but is also applicable for TDD. The inability to configure subframes 0, 4, 5 and 9 as MBSFN subframes may place certain restrictions on which subframes can be used as backhaul subframes, as described below.

Figure 6:
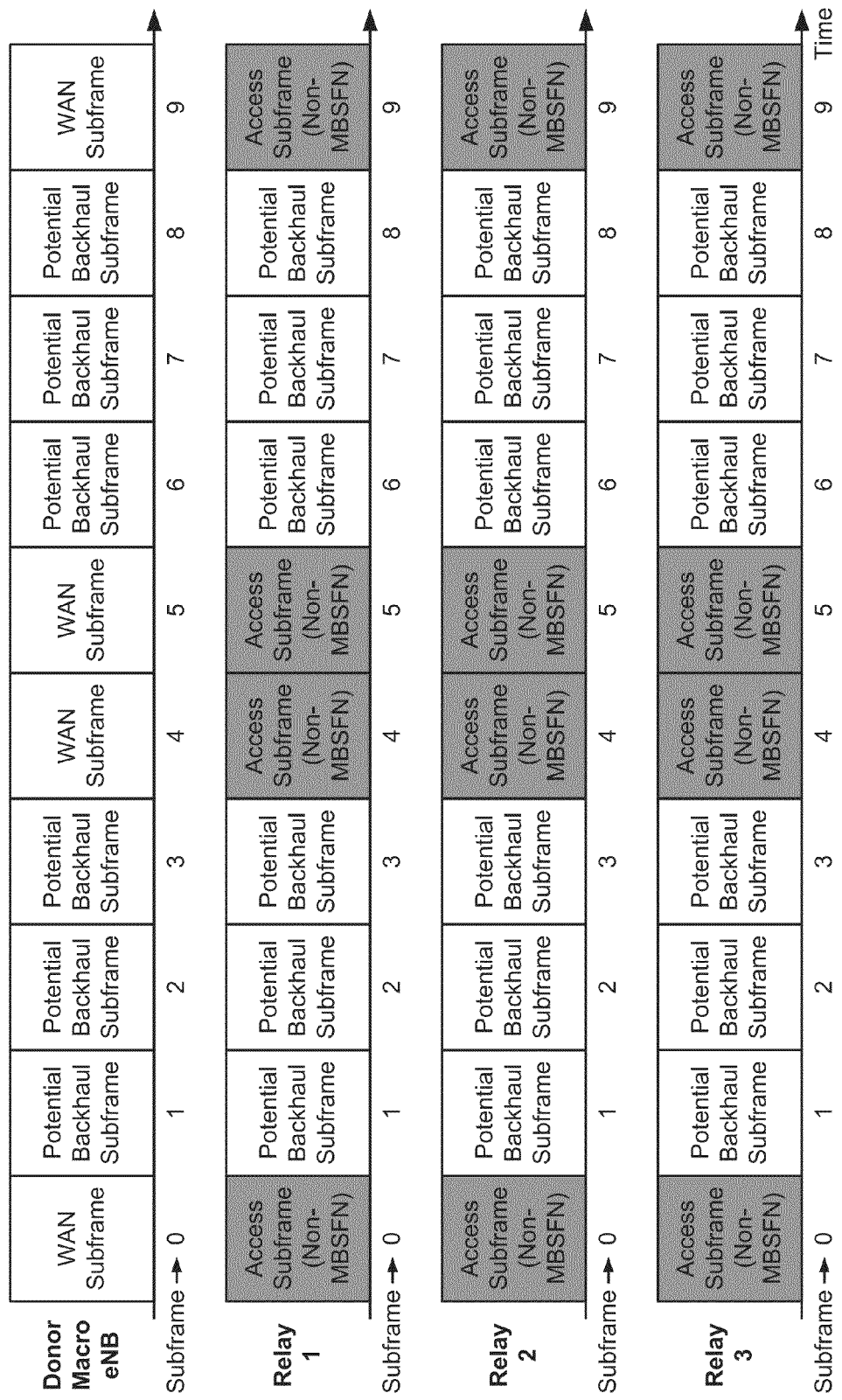
FIG. 6 shows an exemplary backhaul/access partitioning.

FIG. 6 shows an exemplary backhaul/access partitioning without subframe staggering for a scenario with a donor macro eNB and three relays 1, 2 and 3, which may correspond to macro eNB 110 and relays 120a, 120b and 120c in FIG. 1. Without subframe staggering, the subframes of the eNB and the subframes of all relays are time aligned, and the eNB and all relays have the same subframe indexing. For FDD, subframes 0, 4, 5 and 9 cannot be configured as MBSFN subframes by the relays and hence may be used as access subframes by the relays. The remaining subframes 1, 2, 3, 6, 7 and 8 can be configured as MBSFN subframes by the relays and hence may be potential backhaul subframes. In particular, each of subframes 1, 2, 3, 6, 7 and 8 may be configured as a backhaul subframe or an access subframe. The number of subframes to configure as backhaul subframes may be dependent on traffic load or data requirements on the backhaul link.

FIG. 6 shows an exemplary common backhaul/access partitioning without subframe staggering that is used for all relays. In this common partitioning, subframes 0, 4, 5, and 9 are used as access subframes by all relays, and each remaining subframe may be configured as a backhaul subframe or an access subframe for all relays. All relays may transmit to their UEs in each access subframe and may listen to the macro eNB in each backhaul subframe.

Using a common backhaul/access partitioning (or common partitioning) for all relays served by an eNB (e.g., as shown in FIG. 6) may have various limitations. First, the common partitioning may have inflexible resource allocation and may create bottlenecks for resources. For example, the capacity of the backhaul link may be limited because only six or fewer subframes can be used as backhaul subframes for the common partitioning shown in FIG. 6. Second, the common partitioning may result in wasted resources. In particular, all relays may need to listen to the macro eNB in each backhaul subframe even though they may not be scheduled in that subframe. Each relay that is not served in a backhaul subframe could better use the subframe for transmission on the access link. Third, the common partitioning may provide relays with no opportunity to discover neighbor relays. All relays listen in the same backhaul subframes and transmit in the same access subframes and hence would not have an opportunity to listen to each other's transmissions for physical cell identity (PCI) planning and interference management purposes. In LTE Release 8, there are up to 504 PCI values. Each cell is assigned a PCI value that is used for various purposes such as subcarrier offset for the CRS, uplink reference sequence coordination, random sequence initialization, etc. PCI planning is important for the purpose of CRS collision or non-collision (i.e., the same or different offsets) among neighboring cells, inter-cell interference randomization, etc. In the context of relay operation, one or more relays may be served by a donor eNB, and UEs directly served by the relays may observe interference from the donor eNB, especially when range expansion techniques are used. In such a case, PCI planning becomes more important. PCI planning may also be important when UEs served by relays experience strong interference from neighbor relays. Fourth, the common partitioning may not facilitate interference management. Since all relays transmit in the same subframes, nearby relays may create strong interference to each other. There may be other limitations resulting from the use of a common partitioning for all relays.

In an aspect, subframe staggering may be used to support relay communication. For subframe staggering, the subframes of different relays may be staggered from one another. Equivalently, the subframe indexing of each relay may be offset from the subframe indexing of other relays served by the same donor eNB. Subframe staggering may enable more flexible backhaul/access partitioning that may lead to better resource utilization, facilitate neighbor discovery among relays, and/or provide other advantages.

Figure 7:
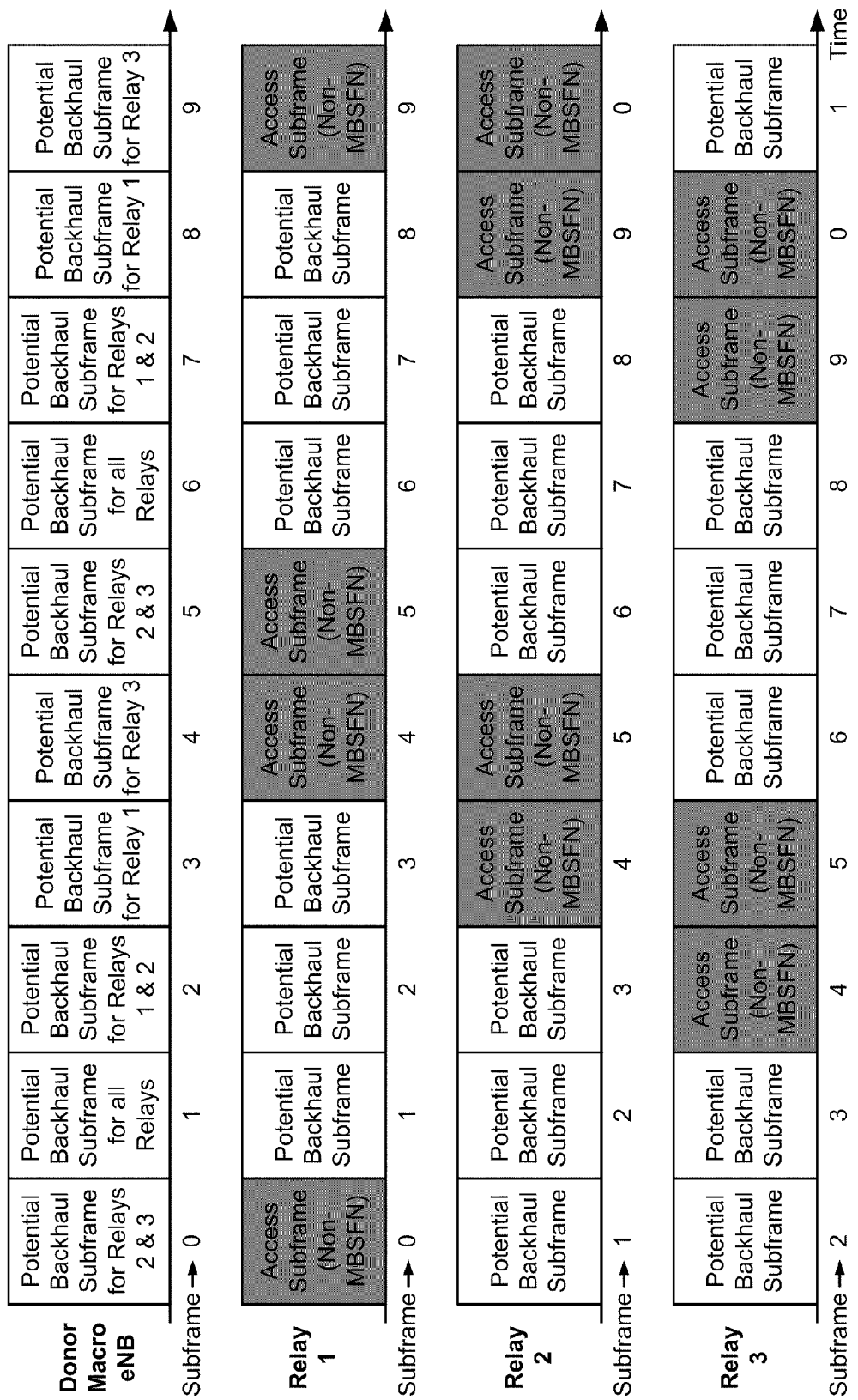
FIG. 7 shows an exemplary backhaul/access partitioning with subframe staggering.

FIG. 7 shows an exemplary backhaul/access partitioning with subframe staggering for a scenario with a donor macro eNB and three relays 1, 2 and 3. In this staggered partitioning, the subframes of relay 1 are time aligned with the subframes of the eNB. The subframes of relay 2 are staggered with respect to the subframes of the eNB by an offset of one subframe. Hence, subframe n of the eNB is time aligned with subframe (n+1) mod 10 of relay 2, for n=0, . . . , 9, where "mod" denotes a modulo operation. The subframes of relay 3 are staggered with respect to the subframes of the eNB by an offset of two subframes. Hence, subframe n of the eNB is time aligned with subframe (n+2) mod 10 of relay 3. In the example shown in FIG. 7, the three relays have different offsets of 0, 1 and 2 subframes.

Other staggering with different offsets may also be used. In general, for a backhaul/access partitioning with a periodicity of N subframes, up to N different offsets may be used for up to N groups of relays, with each group including one or more relays. For simplicity, much of the description below assumes that offsets of 0, 1 and 2 subframes are used for three relays 1, 2 and 3, respectively.

As shown in FIG. 7, subframes 0, 4, 5 and 9 of each relay cannot be configured as MBSFN subframes and may be used as access subframes by that relay. The remaining subframes 1, 2, 3, 6, 7 and 8 of each relay can be configured as MBSFN subframes and may be used as backhaul subframes or access subframes by that relay.

With subframe staggering, the eNB has a different set of subframes that can be used as backhaul subframes for each relay. In particular, the eNB can use its subframes 1, 2, 3, 6, 7 and 8 as backhaul subframes for relay 1, use its subframes 0, 1, 2, 5, 6 and 7 as backhaul subframes for relay 2, and use its subframes 0, 1, 4, 5, 6 and 9 as backhaul subframes for relay 3. The eNB may thus utilize all ten of its subframes (instead of only six subframes in FIG. 6) in each radio frame for backhaul communication with the three relays. The eNB may transmit to each relay in any subframe that can be used as a backhaul subframe for that relay.

With subframe staggering, the eNB may have a different configuration of the backhaul/access partitioning for each relay. The partitioning configuration for each relay may indicate backhaul subframes and access subframes for that relay. Different relays may have different backhaul subframes and access subframes. With a sufficient number of relays with different offsets, at least one relay may be able to transmit on the access link in each subframe of each radio frame, and at least one relay may be served by the eNB on the backhaul link in each subframe.

In one design, a number of groups (or clusters) of relays may be formed. Each group may include one or more relays and may be associated with a specific subframe offset. Different groups of relays may be associated with different subframe offsets and may thus have different configurations of the backhaul/access partitioning. The partitioning configurations for all groups of relays may be defined such that the available resources can be efficiently utilized.

Relays may be arranged into groups in various manners and based on various criteria. In one design, relays that cause strong interference to each other on the access downlink may be placed in different groups such that their access subframes minimally overlap. This may then reduce or avoid interference due to downlink transmissions by these relays on the access downlink to their UEs. In another design, relays that are in close proximity that hence may suffer from relay-to-relay interference may be placed in the same group to facilitate interference management. Relay-to-relay interference may include interference due to the access link of one relay on the backhaul link of another relay. Placing these relays in the same group may avoid one relay transmitting while another relay is receiving on the same frequency band. In yet another design, relays that need to discover neighbor relays may be placed in different groups. This may allow each relay to listen for transmissions from other relays in the backhaul subframes of that relay that overlap with the access subframes of the other relays. In yet another design, groups of relays may be formed by considering load balancing. For example, relays that may be severely backhaul limited may be placed in separate groups so that more backhaul subframes may be available for these relays. Relays may also be placed in groups based on other criteria.

In one design, a donor eNB may form groups of relays based on one or more of the criteria described above. The eNB may form the groups of relays autonomously or via communication with the relays. In one design, the grouping of relays may vary semi-statically or dynamically. For example, two relays may initially be placed in separate groups for neighbor discovery. Thereafter, these two relays may be determined to suffer from relay-to-relay interference and may then be placed in the same group to mitigate the relay-to-relay interference.

Subframe staggering may provide various advantages. First, subframe staggering may enable flexible resource allocation. In particular, relays may be arranged into groups intelligently such that the backhaul or access resources are effectively limited by the total number of subframes. Without subframe staggering, the total number of backhaul subframes may be limited to six subframes per radio frame if MBSFN subframes are used for backhaul subframes. Second, subframe staggering may avoid or reduce resource wastage since all subframes can potentially be used for the backhaul link or the access link with subframe staggering. Third, subframe staggering may facilitate neighbor discovery among relays. In particular, relays with different subframe offsets may have different configurations of the backhaul/access partitioning, which may allow these relays to use their backhaul subframes to monitor for downlink transmissions from other relays. The relays may then be able to discover neighbor relays for PCI planning and interference management purposes. Coordinated silencing may also be used to support discovery of neighbor relays. With coordinated silencing, relays may silence their PBCH, PSS and SSS transmission in some coordinated manner so that relays that remain silent can detect the PBCH, PSS and SSS of the neighbor relays. However, discovery of neighbor relays may be much easier with subframe staggering. Fourth, subframe staggering may enable better interference management for relays. For example, relays in close proximity may benefit from interference reduction if they are placed in the same group and hence can avoid relay-to-relay interference.

The wireless network may support data transmission with HARQ on the WAN link, the backhaul link, and/or the access link. For HARQ, a transmitter may send an initial transmission of a packet to a receiver and may send one or more additional transmissions of the packet, if needed, until the packet is decoded correctly by the receiver or some other termination condition is encountered. LTE supports synchronous HARQ on the uplink and asynchronous HARQ on the downlink. For synchronous HARQ, all transmissions of a packet may be sent in subframes of a single interlace. A number of interlaces may be defined, and each interlace may include subframes that are spaced apart by S subframes, where S may be equal to eight or some other value. For asynchronous HARQ, each transmission of the packet may be scheduled and sent in any subframe.

In another aspect, a backhaul/access partitioning configuration for a relay may be defined such that either all subframes with even indices or all subframes with odd indices are access subframes for the relay. This design can support synchronous HARQ on the access link for the relay. For example, if an initial transmission of a packet is sent in an odd subframe (or an even subframe), then all odd subframes (or all even subframes) may potentially be used for subsequent transmissions of the packet. This is because each radio frame includes ten subframes, but additional transmissions may be sent eight subframes after a prior transmission. For example, an initial transmission may be sent in subframe 0, and subsequent transmissions may be sent in subframe 8, then subframe 6, then subframe 4, then subframe 2, etc. HARQ for the access link may be supported by defining the partitioning configuration for the relay to include all subframes with even indices or all subframes with odd indices as access subframes.

Figure 8:
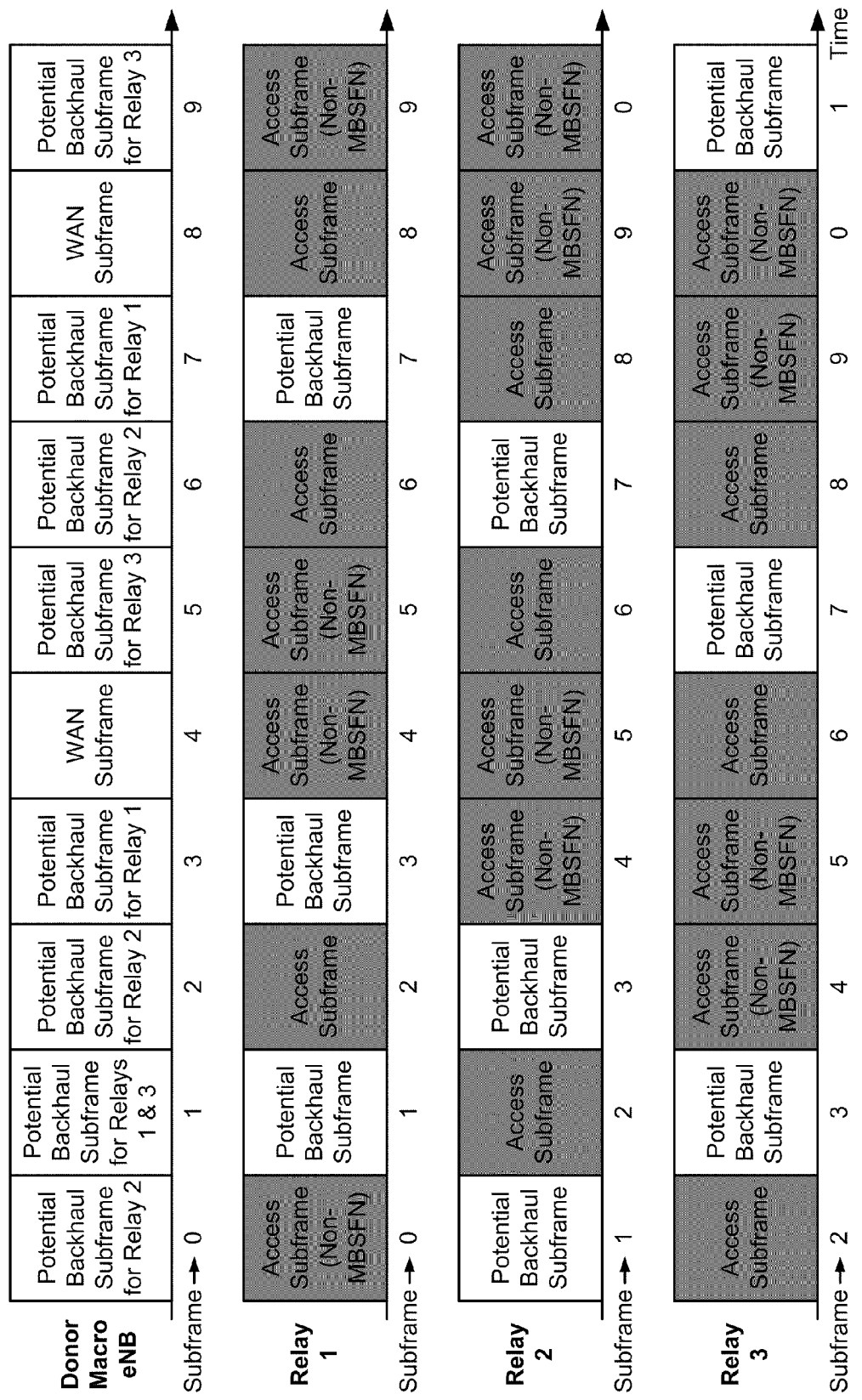
FIG. 8 shows an exemplary backhaul/access partitioning with subframe staggering and support for HARQ.

FIG. 8 shows an exemplary backhaul/access partitioning with subframe staggering and support for HARQ for a scenario with a donor macro eNB and three relays 1, 2 and 3. In this staggered partitioning, the subframes of relays 1, 2 and 3 are staggered with respect to the subframes of the eNB by offsets of 0, 1 and 2 subframes, respectively, as described above for FIG. 7. In the design shown in FIG. 8, all subframes with even indices of each relay are used for access subframes of that relay. In this design, the access subframes for the relays are staggered. This design may increase the total number of potential backhaul subframes for the eNB.

In another design that is not shown in FIG. 8, the access subframes of all relays may be time aligned. For example, all subframes with even indices of relay 1 may be used as access subframes, all subframes with odd indices of relay 2 may be used as access subframes, and all subframes with even indices of relay 3 may be used as access subframes. In this example, the access subframes of all relays correspond to subframes with even indices of the eNB. Alternatively, the access subframes of all relays may correspond to subframes with odd indices of the eNB.

All subframes with either even or odd indices of the relays may also be used for access subframes without subframe staggering. In one design, all three relays 1, 2 and 3 may have the same backhaul/access partitioning configuration, which may be the partitioning configuration for relay 1 in FIG. 8. In another design, all subframes with even indices of some relays (e.g., relays 1 and 3) may be used for access subframes, and all subframes with odd indices of some other relays (e.g., relay 2) may be used for access subframes. The access subframes of relays may also be defined in other manners.

In yet another aspect, reserved subframes may be used to support range extension, which is a scenario in which a UE may associate with a relay even though a macro eNB may be received stronger by the UE. In such a scenario, downlink transmission from the eNB on the WAN downlink may cause excessive interference to downlink transmission from the relay to the UE on the access downlink. The eNB may then configure some subframes as reserved subframes and may either avoid transmitting or reduce its transmit power in each reserved subframe in order to reduce interference to the UE. The relay may send downlink transmission to the UE and/or other "extended coverage" UEs in the reserved subframes to observe less or no interference from the eNB. The relay may also serve other UEs in the reserved subframes if the resources in these subframes are not all used up to serve the extended coverage UEs.

A reserved subframe may be implemented with an MBSFN subframe, or a blank subframe, or an almost blank subframe, or a subframe of some other type. By using any one of these non-regular subframes for the reserved subframe, an eNB may be able to reduce its transmit power (no zero or a low level) in all or most of the reserved subframe so that it can reduce interference to the extended coverage UEs. For clarity, the use of MBSFN subframes for reserved subframes is described below. If reserved subframes are implemented with MBSFN subframes, then subframes 0, 4, 5 and 9 of an eNB cannot be configured as reserved subframes for FDD in LTE Release 8. The reserved subframes may thus be limited to subframes 1, 2, 3, 6, 7 and 8.

Table 1 shows a design of implementing backhaul subframes, access subframes, and reserved subframes. A relay may configure its backhaul subframes as MBSFN subframes to reduce the amount of transmission on the access link. An eNB may configure its reserved subframes as MBSFN subframes to reduce the amount of interference caused to extended coverage UEs. Subframes of other types may also be used for the backhaul subframes and reserved subframes.

TABLE 1

|  | eNB Configuration | Relay Configuration |
| --- | --- | --- |
| Backhaul Subframe | Any Subframe | MBSFN Subframe |
| Access Subframe | Any Subframe | Any Subframe |
| Reserved Subframe | MBSFN Subframe | Any Subframe |

Reserved subframes may be used in combination with subframe staggering. However, the subframe offsets for different relays (or different groups of relays) should be selected with care if the reserved subframes are configured as MBSFN subframes.

Figure 9:
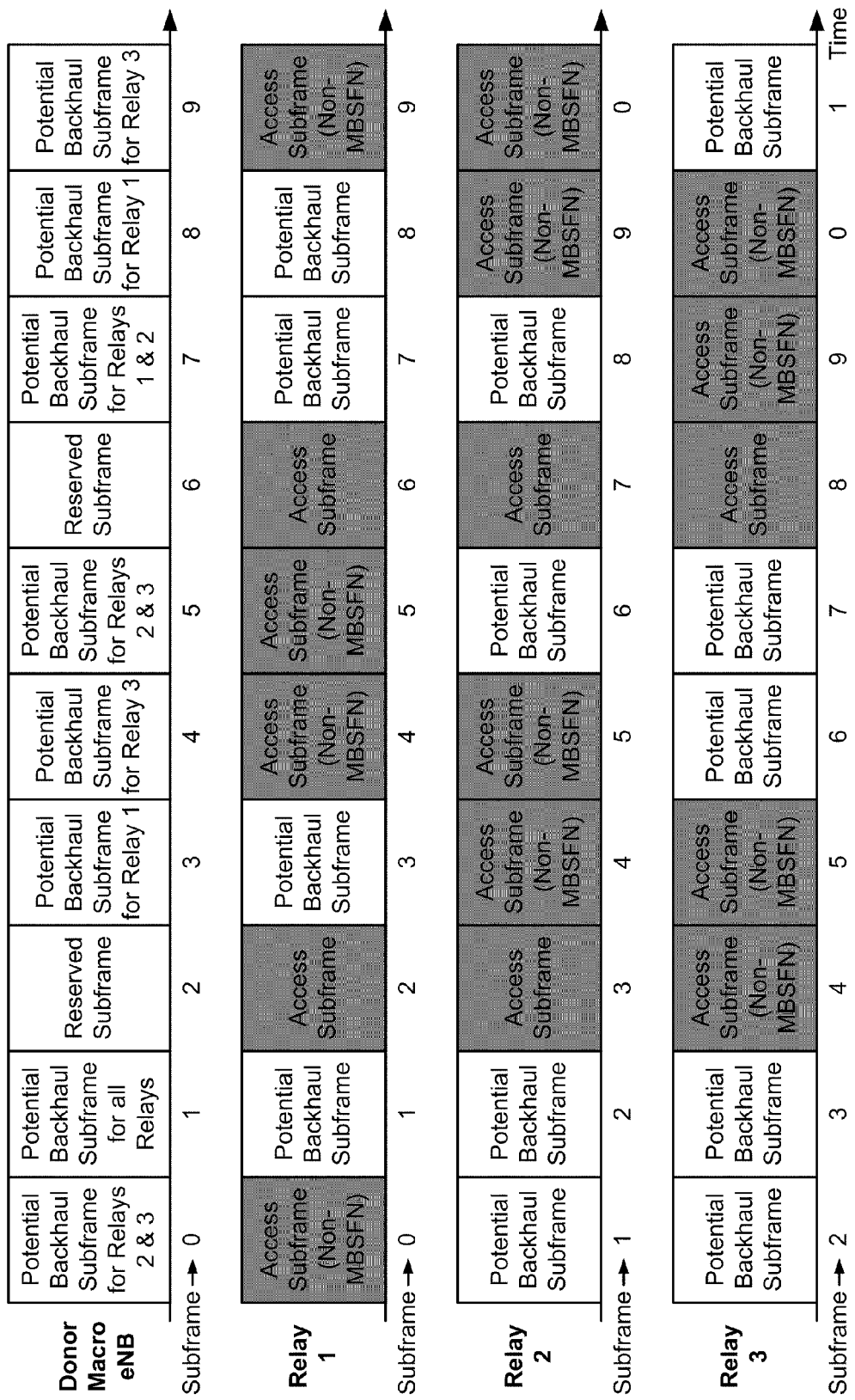
FIG. 9 shows an exemplary backhaul/access partitioning with subframe staggering and reserved subframes.

FIG. 9 shows an exemplary backhaul/access partitioning with subframe staggering and reserved subframes for a scenario with a donor macro eNB and three relays 1, 2 and 3. In this staggered partitioning, the subframes of relays 1, 2 and 3 are staggered with respect to the subframes of the eNB by offsets of 0, 1 and 2 subframes, respectively. In the example shown in FIG. 9, subframes 2 and 6 of the eNB are configured as reserved subframes. In general, any one of subframes 1, 2, 3, 6, 7 and 8 of the eNB may be designated as a reserved subframe and may be configured as an MBSFN subframe.

In the example shown in FIG. 9, the subframes of relay 1 are time aligned with the subframes of the eNB. The access subframes for relay 1 may include subframes 0, 4, 5 and 9 of relay 1 (which cannot be configured as MBSFN subframes) as well as subframes 2 and 6 of relay 1 (which correspond to reserved subframes 2 and 6 of the eNB). The subframes of relay 2 are staggered with respect to the subframes of the eNB by an offset of one subframe. The access subframes for relay 2 may include subframes 0, 4, 5 and 9 of relay 2 (which cannot be configured as MBSFN subframes) as well as subframes 3 and 7 of relay 2 (which correspond to reserved subframes 2 and 6 of the eNB). The subframes of relay 3 are staggered with respect to the subframes of the eNB by an offset of two subframes. The access subframes for relay 3 may include subframes 0, 4, 5 and 9 of relay 3 (which cannot be configured as MBSFN subframes) as well as subframe 8 of relay 3 (which corresponds to reserved subframe 6 of the eNB).

In general, for a backhaul/access partitioning with a periodicity of N subframes, up to N different subframe offsets may be used for up to N groups of relays. Up to N different configurations of a backhaul/access partitioning may be defined for different subframe offsets with a given set of one or more reserved subframes. FIG. 9 shows three of ten possible partitioning configurations for a case of two reserved subframes 2 and 6.

The reserved subframes may be used for the access link by relays and may not be used for the backhaul link by the relays. The reserved subframes may thus reduce the number of potential backhaul subframes for each relay, e.g., as shown by comparing FIG. 7 with FIG. 9. The fewer potential backhaul subframes may be justified by an enhancement in performance for range extension afforded by the use of reserved subframes.

Reserved subframes may also be used to support range extension without subframe staggering. In this case, all three relays may have the same backhaul/access partitioning configuration, which may be the partitioning configuration for relay 1 in FIG. 9.

Figure 10:
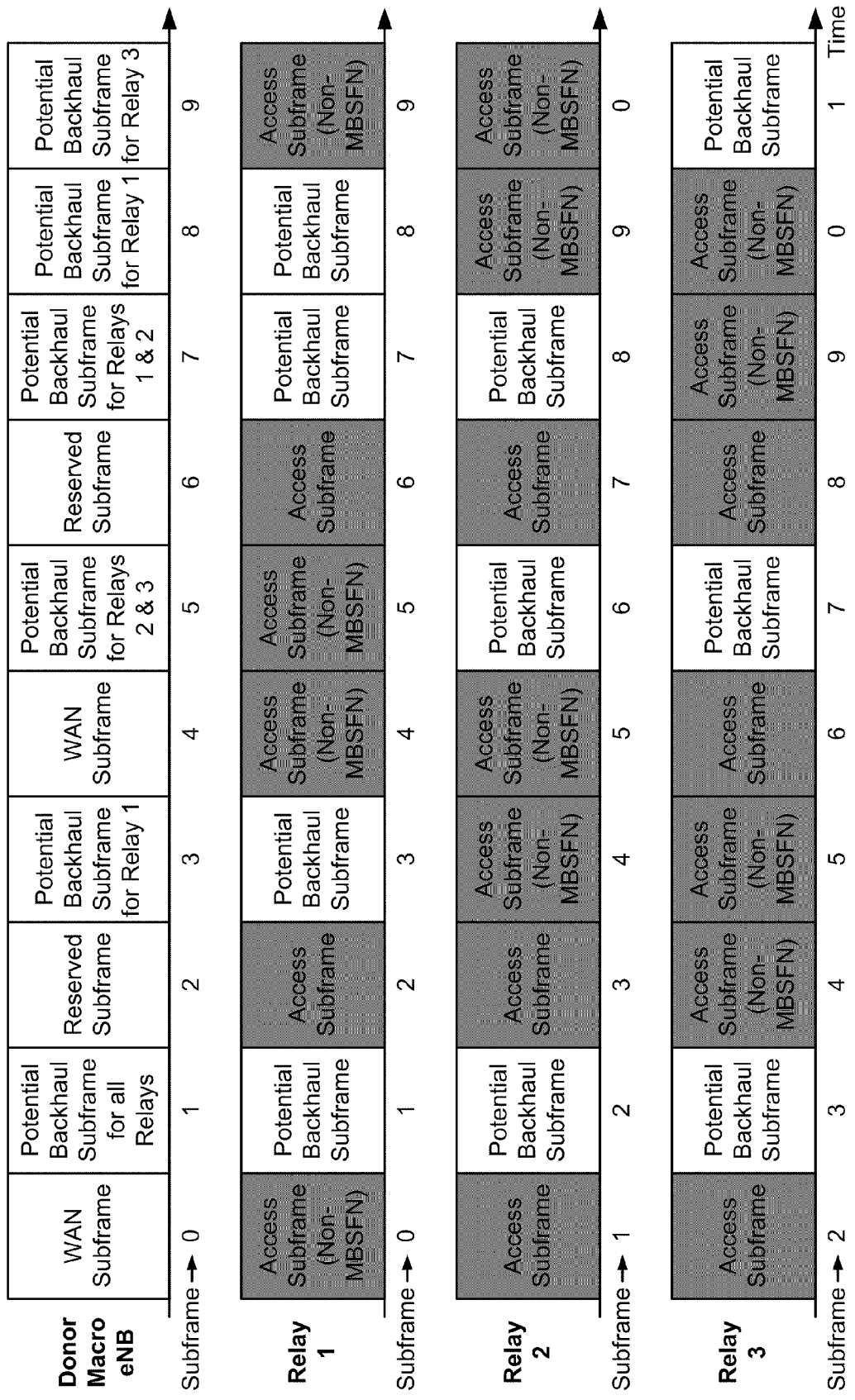
FIG. 10 shows an exemplary backhaul/access partitioning with subframe staggering, reserved subframes, and support for HARQ.

FIG. 10 shows an exemplary backhaul/access partitioning with subframe staggering, reserved subframes, and support for HARQ for a scenario with a donor macro eNB and three relays 1, 2 and 3. In this staggered partitioning, the subframes of relays 1, 2 and 3 are staggered with respect to the subframes of the eNB by offsets of 0, 1 and 2 subframes, respectively. In the example shown in FIG. 10, subframes 2 and 6 of the eNB are configured as reserved subframes. The access subframes of each relay may be defined such that these access subframes include the reserved subframes of the eNB. Hence, the access subframes of relay 1 may include all subframes of relay 1 with even indices. The access subframes of relay 2 may include all subframes of relay 2 with odd indices. The access subframes of relay 3 may include all subframes of relay 3 with even indices. Each relay can thus support data transmission with HARQ for its UEs on its access subframes.

Subframe staggering may enable HARQ to be more efficiently supported. If subframe staggering is not used, then at least half of the available subframes (e.g., all even or all odd subframes) may be used for access subframes. Furthermore, some of the remaining subframes cannot be backhaul subframes due to constraints of MBSFN subframes. Overall, at most three subframes may be available for use as backhaul subframes for all relays in each radio frame when subframe staggering is not used. This may limit the capacity of the backhaul link and may adversely impact network performance. The use of subframe staggering may greatly increase the number of potential backhaul subframes for all relays (e.g., to six subframes in FIG. 10), which may improve network performance.

Figures 11, 12:
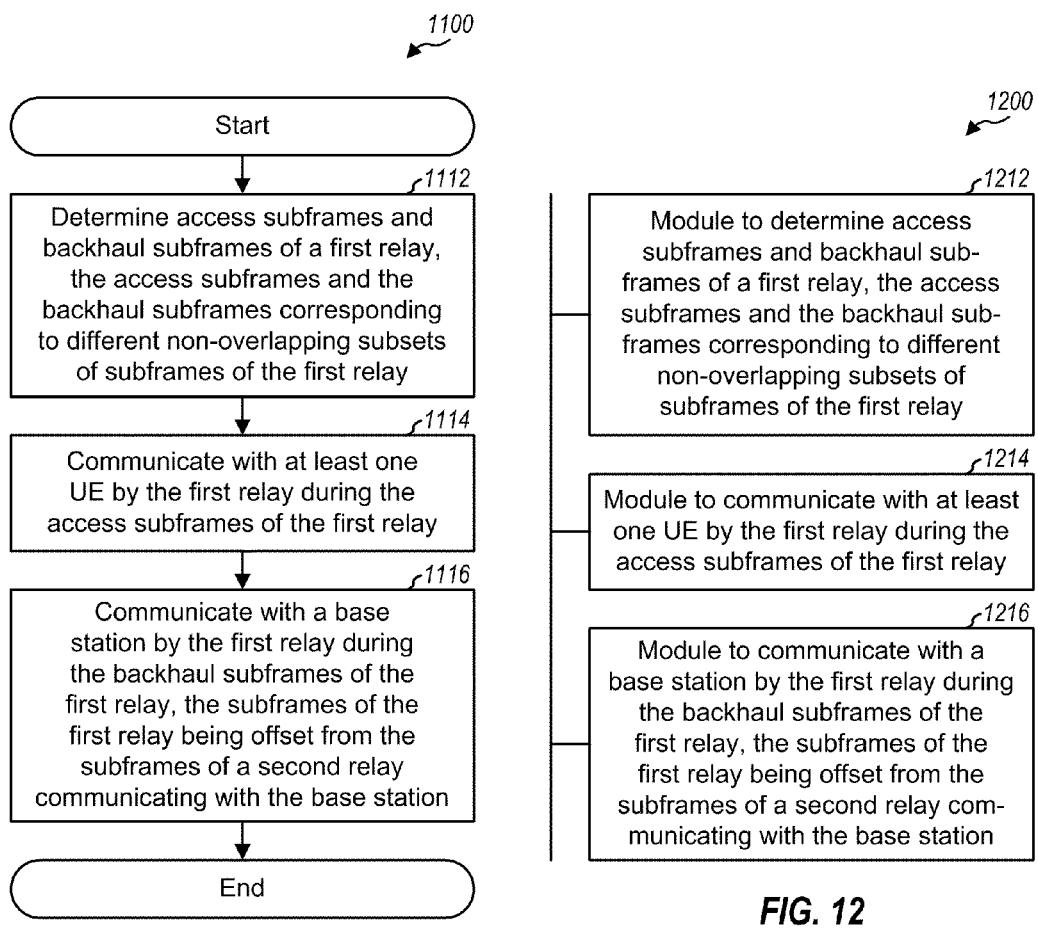
FIGS. 11 and 12 show a process and an apparatus, respectively, for supporting communication by a relay.

FIG. 11 shows a design of a process 1100 for supporting communication by a first relay. The first relay may determine access subframes and backhaul subframes of the first relay (block 1112). The access subframes and the backhaul subframes may correspond to different non-overlapping subsets of subframes of the first relay. The first relay may communicate with at least one UE on the access link during the access subframes of the first relay (block 1114). The first relay may communicate with a base station on the backhaul link during the backhaul subframes of the first relay (block 1116). The subframes of the first relay may be offset (e.g., by an integer number of subframes) from the subframes of a second relay communicating with the base station, e.g., as shown in FIG. 7.

The first relay may have a first set of potential backhaul subframes (e.g., subframes 1, 2, 3, 6, 7 and 8 of relay 1 in FIG. 7) in which the first relay is able to communicate with the base station. The second relay may have a second set of potential backhaul subframes (e.g., subframes 1, 2, 3, 6, 7 and 8 of relay 2 in FIG. 7) in which the second relay is able to communicate with the base station. A superset of the first and second sets of potential backhaul subframes for the first and second relays (e.g., corresponding to subframes 0 to 3 and 5 to 8 of the macro eNB in FIG. 7) may be increased due to the offset between the subframes of the first relay and the subframes of the second relay. This increase in the number of potential backhaul subframes for the macro eNB can be seen by comparing FIG. 6 to FIG. 7.

In one design, the first set of potential backhaul subframes for the first relay may include all subframes that can be configured as MBSFN subframes by the first relay. In another design, the first set of potential backhaul subframes may include subframes that can be configured as blank subframes, or almost blank subframes, or subframes of some other type. In one design, the backhaul subframes of the first relay may be selected from the first set of potential backhaul subframes for the first relay. The first relay may configure each of its backhaul subframes as an MBSFN subframe, or a blank subframe, or an almost blank subframe, or a subframe of some other type, so that the first relay can transmit as little as possible in each backhaul subframe.

The subframes of the first relay may be offset by a first amount (e.g., one subframe) from the subframes of the second relay and may further be offset by a second amount (e.g., two subframes) from the subframes of a third relay communicating with the base station. The second amount may be different from the first amount. In general, the subframes of the first relay may be offset from the subframes of any number of relays by any number of different offsets.

In one design, the access subframes of the first relay may include either all subframes with odd indices or all subframes with even indices of the first relay, e.g., as shown in FIG. 8. The first relay may receive data transmission sent with HARQ by the at least one UE during the access subframes of the first relay.

In one design, at least one of the access subframes of the first relay may correspond to at least one reserved subframe of the base station, e.g., as shown in FIG. 9. Each reserved subframe may have reduced transmit power (e.g., low or no transmit power) from the base station in order to reduce interference to the at least one UE communicating with the first relay.

In one design, a plurality of groups of relays may be formed based on one or more of the criteria described above. Each group may include at least one relay. The first relay may belong in a first group of relays associated with a first subframe offset. The second relay may belong in a second group of relays associated with a second subframe offset, which may be different from the first subframe offset.

In one design, for communication on the downlink, the first relay may (i) send data transmission to the at least one UE during the access subframes of the first relay in block 1114 and (ii) receive data transmission from the base station during the backhaul subframes of the first relay in block 1116. In another design, for communication on the uplink, the first relay may (i) receive data transmission from the at least one UE during the access subframes of the first relay in block 1114 and (ii) send data transmission to the base station during the backhaul subframes of the first relay in block 1116.

The first relay may detect for other relays during at least a subset of the backhaul subframes of the first relay. For coordinated silencing, the first relay may silence transmission of at least one broadcast channel (e.g., the PBCH) and/or at least one synchronization signal (e.g., the PSS and SSS) during the subset of the backhaul subframes of the first relay in order to detect for other relays.

FIG. 12 shows a design of an apparatus 1200 for supporting communication by a relay. Apparatus 1200 includes a module 1212 to determine access subframes and backhaul subframes of a first relay, the access subframes and the backhaul subframes corresponding to different non-overlapping subsets of subframes of the first relay, a module 1214 to communicate with at least one UE by the first relay during the access subframes of the first relay, and a module 1216 to communicate with a base station by the first relay during the backhaul subframes of the first relay, the subframes of the first relay being offset from the subframes of a second relay communicating with the base station.

FIG. 13 shows a design of a process 1300 for supporting communication by a base station. The base station may determine first backhaul subframes for a first relay and second backhaul subframes for a second relay (block 1312). The first and second backhaul subframes may correspond to different (overlapping or non-overlapping) subsets of subframes of the base station. The subframes of the first relay may be offset from the subframes of the second relay. The base station may communicate with the first relay during the first backhaul subframes (block 1314). The base station may communicate with the second relay during the second backhaul subframes (block 1316).

In one design, the base station may select the first backhaul subframes from a first set of potential backhaul subframes in which the first relay is able to communicate with the base station. The base station may select the second backhaul subframes from a second set of potential backhaul subframes in which the second relay is able to communicate with the base station. In one design, the first set of potential backhaul subframes may include all subframes that can be configured as MBSFN subframes by the first relay. The second set of potential backhaul subframes may include all subframes that can be configured as MBSFN subframes by the second relay. In another design, the potential backhaul subframes for each relay may include subframes that can be configured as blank subframes, or almost blank subframes, or subframes of some other type by that relay. In any case, a superset of the first and second sets of potential backhaul subframes for the first and second relays may be increased due to the offset between the subframes of the first relay and the subframes of the second relay. In one design, at least one of the first backhaul subframes for the first relay (e.g., backhaul subframe 3 of relay 1 in FIG. 7) may correspond to at least one access subframe of the second relay (e.g., access subframe 4 of relay 2 in FIG. 7).

In one design, the first backhaul subframes may exclude either all subframes with odd indices or all subframes with even indices of the first relay. This may allow the first relay to support data transmission with HARQ for its UEs. Similarly, the second backhaul subframes may exclude either all subframes with odd indices or all subframes with even indices of the second relay.

In one design, the base station may determine at least one reserved subframe of the base station corresponding to at least one access subframe of the first relay. The base station may reduce its transmit power (e.g., to zero or a low value) during the at least one reserved subframe to reduce interference to UEs communicating with the first relay or the second relay. In one design, the base station may configure each reserved subframe as an MBSFN subframe, or a blank subframe, or an almost blank subframe, or a subframe of some other type, so that the base station can transmit as little as possible in each reserved subframe.

In one design, the base station may determine third backhaul subframes for a third relay. The third backhaul subframes may correspond to another subset of the subframes of the base station. The subframes of the third relay may be offset from the subframes of the first and second relays. The base station may communicate with the third relay during the third backhaul subframes.

In one design, the base station may determine a first group of relays including the first relay and associated with a first subframe offset. The base station may determine a second group of relays including the second relay and associated with a second subframe offset, which may be different from the first subframe offset. In general, a plurality of groups of relays, including the first and second groups, may be formed based on one or more of the criteria described above. Each group may include at least one relay.

FIG. 14 shows a design of an apparatus 1400 for supporting communication by a base station. Apparatus 1400 includes a module 1412 to determine first backhaul subframes for a first relay and second backhaul subframes for a second relay, the first and second backhaul subframes corresponding to different subsets of subframes of a base station, and the subframes of the first relay being offset from the subframes of the second relay, a module 1414 to communicate with the first relay by the base station during the first backhaul subframes, and a module 1416 to communicate with the second relay by the base station during the second backhaul subframes.

FIG. 15 shows a design of a process 1500 for communicating by a UE. The UE may access a first relay for communication between the UE and a base station (block 1512). The UE may communicate with the first relay during access subframes of the first relay (block 1514). The access subframes of the first relay may correspond to a first subset of the subframes of the first relay. The first relay and a second relay may communicate with the base station, and the subframes of the first relay may be offset from the subframes of the second relay.

The UE may receive signals (e.g., a CRS) from the first relay during backhaul subframes of the first relay (block 1516). The backhaul subframes of the first relay may correspond to a second subset of the subframes of the first relay, which may be non-overlapping with the first subset of the subframes of the first relay. The backhaul subframes of the first relay may be configured as MBSFN subframes, or blank subframes, or almost blank subframes, or subframes of some other type by the first relay.

In one design, the access subframes of the first relay may include either all subframes with odd indices or all subframes with even indices of the first relay, e.g., as shown in FIG. 8. The UE may send data transmission with HARQ to the first relay during the access subframes of the first relay in block 1514.

In one design, at least one of the access subframes of the first relay may correspond to at least one reserved subframe of the base station. The at least one reserved subframe may have reduced (e.g., low or no) transmit power from the base station to reduce interference to at least one UE communicating with the first relay.

FIG. 16 shows a design of an apparatus 1600 for communicating by a UE. Apparatus 1600 includes a module 1612 to access a first relay by the UE for communication between the UE and a base station, a module 1614 to communicate with the first relay by the UE during access subframes of the first relay, wherein the access subframes of the first relay correspond to a first subset of the subframes of the first relay, wherein the first relay and a second relay communicate with the base station, and wherein the subframes of the first relay are offset from the subframes of the second relay, and a module 1616 to receive signals from the first relay by the UE during backhaul subframes of the first relay, the backhaul subframes of the first relay corresponding to a second subset of the subframes of the first relay.

The modules in FIGS. 12, 14 and 16 may comprise processors, electronic devices, hardware devices, electronic components, logical circuits, memories, software codes, firmware codes, etc., or any combination thereof.

Figure 17:
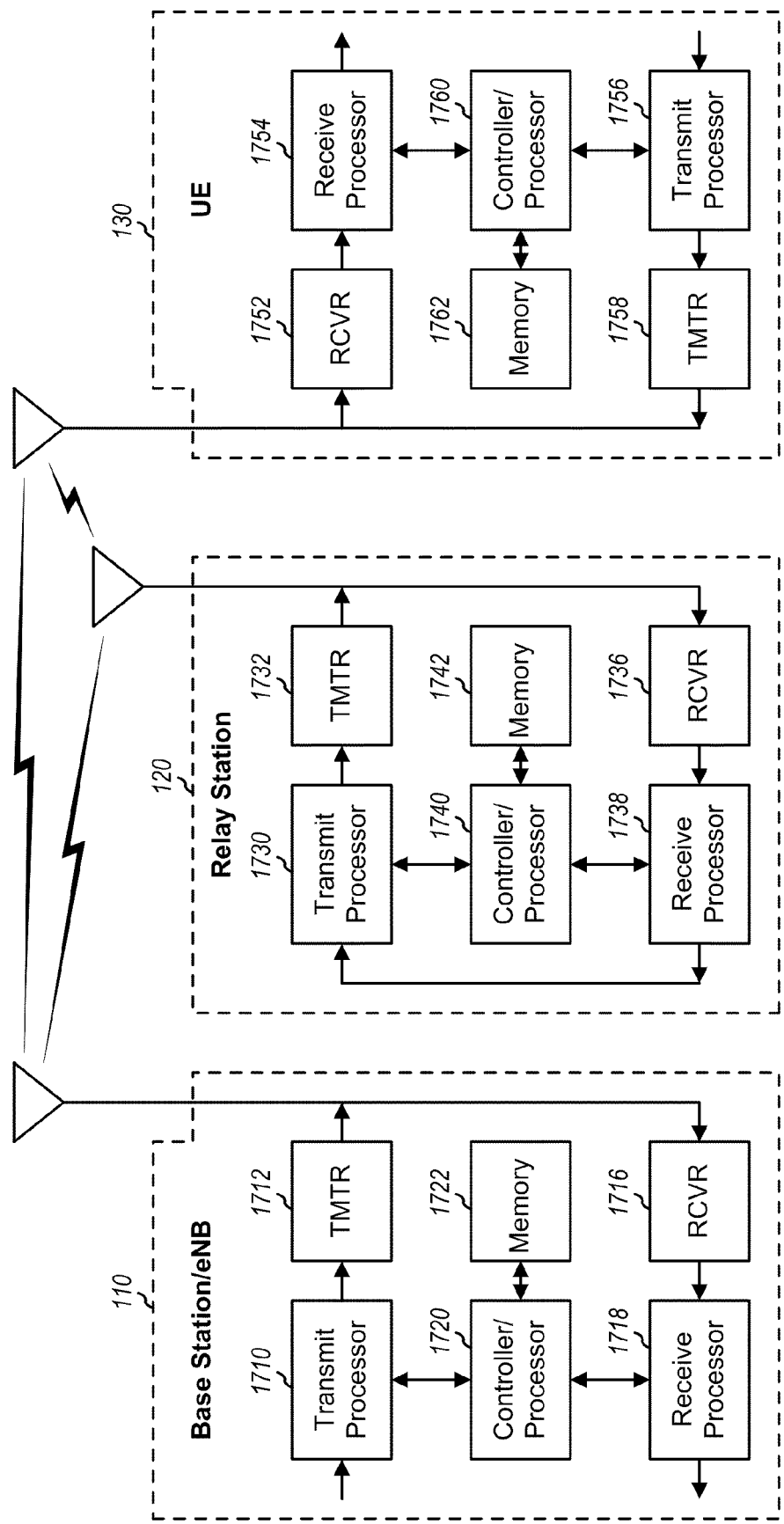
FIG. 17 shows a block diagram of a base station, a relay, and a UE.

FIG. 17 shows a block diagram of a design of base station/eNB 110, relay 120, and UE 130, which may be one of the relays and one of the UEs in FIG. 1. Base station 110 may send transmissions to one or more UEs on the downlink via relay 120 and may also receive transmissions from one or more UEs on the uplink via relay 120. For simplicity, processing for transmissions sent to and received from only UE 130 is described below.

At base station 110, a transmit processor 1710 may receive packets of data to send to UE 130 and may process (e.g., encode and modulate) each packet in accordance with a selected modulation and coding scheme to obtain data symbols. For HARQ, processor 1710 may generate multiple transmissions of each packet and may provide one transmission at a time. Processor 1710 may also process control information to obtain control symbols, generate reference symbols for reference signals, and multiplex the data symbols, the control symbols, and the reference symbols. Processor 1710 may further process the multiplexed symbols (e.g., for OFDM, etc.) to generate output samples. A transmitter (TMTR) 1712 may condition (e.g., convert to analog, amplify, filter, and upconvert) the output samples to generate a downlink signal, which may be transmitted to relay 120 and UEs.

At relay 120, the downlink signal from base station 110 may be received and provided to a receiver (RCVR) 1736. Receiver 1736 may condition (e.g., filter, amplify, downconvert, and digitize) the received signal and provide input samples. A receive processor 1738 may process the input samples (e.g., for OFDM, etc.) to obtain received symbols. Processor 1738 may further process (e.g., demodulate and decode) the received symbols to recover the data and control information sent to UE 130. A transmit processor 1730 may process (e.g., encode and modulate) the recovered data and control information from processor 1738 in the same manner as base station 110 to obtain data symbols and control symbols. Processor 1730 may also generate reference symbols, multiplex the data and control symbols with the reference symbols, and process the multiplexed symbols to obtain output samples. A transmitter 1732 may condition the output samples and generate a downlink relay signal, which may be transmitted to UE 130.

At UE 130, the downlink signal from base station 110 and the downlink relay signal from relay 120 may be received and conditioned by a receiver 1752, and processed by a receive processor 1754 to recover the data and control information sent to UE 130. A controller/processor 1760 may generate ACK information for correctly decoded packets. Data and control information (e.g., ACK information) to be sent on the uplink may be processed by a transmit processor 1756 and conditioned by a transmitter 1758 to generate an uplink signal, which may be transmitted to relay 120.

At relay 120, the uplink signal from UE 130 may be received and conditioned by receiver 1736, and processed by receive processor 1738 to recover the data and control information sent by UE 130. The recovered data and control information may be processed by transmit processor 1730 and conditioned by transmitter 1732 to generate an uplink relay signal, which may be transmitted to base station 110. At base station 110, the uplink relay signal from relay 120 may be received and conditioned by a receiver 1716, and processed by a receive processor 1718 to recover the data and control information sent by UE 130 via relay 120. A controller/processor 1720 may control transmission of data based on the control information from UE 130.

Controllers/processors 1720, 1740 and 1760 may direct operation at base station 110, relay 120, and UE 130, respectively. Controller/processor 1720 may perform or direct process 1400 in FIG. 14 and/or other processes for the techniques described herein. Controller/processor 1740 may perform or direct process 1200 in FIG. 12 and/or other processes for the techniques described herein. Controller/processor 1760 may perform or direct process 1600 in FIG. 16 and/or other processes for the techniques described herein. Memories 1722, 1742 and 1762 may store data and program codes for base station 110, relay 120, and UE 130, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
determining access subframes and backhaul subframes of a first relay, the access subframes and the backhaul subframes corresponding to different non-overlapping subsets of subframes of the first relay;
communicating, via the first relay, with at least one user equipment (UE) during the access subframes of the first relay;
communicating, via the first relay, with a base station during the backhaul subframes of the first relay,
subframe numbers of the first relay being offset at each time instance from subframe numbers of a second relay communicating with the base station, and
the access subframes and the backhaul subframes of the first relay having a same subframe number as access subframes and backhaul subframes of the second relay.

2. The method of claim 1, wherein:
the first relay comprises a first set of potential backhaul subframes for communicating with the base station,
the second relay comprises a second set of potential backhaul subframes for communicating with the base station, and
a superset of the first set and the second set of potential backhaul subframes for the first relay and the second relay is increased in comparison to a superset of non-offset subframes.

3. The method of claim 2, wherein the first set of potential backhaul subframes includes multicast/broadcast single frequency network (MBSFN) subframes.

4. The method of claim 2, wherein the backhaul subframes of the first relay are selected from the first set of potential backhaul subframes for the first relay.

5. The method of claim 1, wherein the subframes of the first relay are offset from the subframes of the second relay by an integer value.

6. The method of claim 1, wherein:
the subframes of the first relay are offset from the subframes of the second relay by a first value, and
the subframes of the first relay are offset from subframes of a third relay by a second, the second value being different from the first value.

7. The method of claim 1, wherein the access subframes of the first relay are subframes with odd indices or subframes with even indices.

8. The method of claim 7, wherein the communicating with the at least one UE comprises receiving data transmitted by the at least one UE with hybrid automatic retransmission (HARQ) during the access subframes of the first relay.

9. The method of claim 1, wherein at least one of the access subframes of the first relay correspond to at least one reserved subframe of the base station, each reserved subframe having reduced transmit power in comparison to a baseline transmit power from the base station, and interference to the at least one UE communicating with the first relay being reduced in comparison to interference resulting from transmissions at the baseline transmit power.

10. The method of claim 1, further comprising:
configuring each of the backhaul subframes of the first relay as a multicast/broadcast single frequency network (MBSFN) subframe, a blank subframe, or an almost blank subframe.

11. The method of claim 1, wherein the first relay belongs in a first group of relays associated with a first subframe set, the second relay belongs in a second group of relays associated with a second subframe set, each group includes at least one relay, and the second subframe set is different from the first subframe set.

12. The method of claim 1, wherein the communicating with the at least one UE comprises transmitting data to the at least one UE during the access subframes of the first relay, and the communicating with the base station comprises receiving data from the base station during the backhaul subframes of the first relay.

13. The method of claim 1, wherein the communicating with the at least one UE comprises receiving data from the at least one UE during the access subframes of the first relay, and the communicating with the base station comprises transmitting data to the base station during the backhaul subframes of the first relay.

14. The method of claim 1, further comprising:
detecting other relays communicating with the base station during at least a subset of the backhaul subframes of the first relay.

15. The method of claim 14, further comprising:
silencing transmission of at least one broadcast channel, at least one synchronization signal, or a combination thereof during the subset of the backhaul subframes of the first relay.

16. An apparatus for wireless communication, comprising:
means for determining access subframes and backhaul subframes of a first relay, the access subframes and the backhaul subframes corresponding to different non-overlapping subsets of subframes of the first relay;
means for communicating, via the first relay, with at least one user equipment (UE) during the access subframes of the first relay;
means for communicating, via the first relay, with a base station during the backhaul subframes of the first relay, subframe numbers of the first relay being offset at each time instance from subframe numbers of a second relay communicating with the base station, and
the access subframes and the backhaul subframes of the first relay having a same subframe number as access subframes and backhaul subframes of the second relay.

17. The apparatus of claim 16, wherein the access subframes of the first relay are subframes with odd indices or subframes with even indices.

18. The apparatus of claim 16, wherein at least one of the access subframes of the first relay correspond to at least one reserved subframe of the base station, each reserved subframe having reduced transmit power in comparison to a baseline transmit power from the base station, and interference to the at least one UE communicating with the first relay being reduced in comparison to interference resulting from transmissions at the baseline transmit power.

19. The apparatus of claim 16, further comprising:
means for configuring each of the backhaul subframes of the first relay as a multicast/broadcast single frequency network (MBSFN) subframe, a blank subframe, or an almost blank subframe.

20. An apparatus for wireless communication, comprising:
a memory unit; and
at least one processor coupled with the memory unit, the at least one processor configured:
to determine access subframes and backhaul subframes of a first relay, the access subframes and the backhaul subframes corresponding to different non-overlapping subsets of subframes of the first relay,
to communicate, via the first relay, with at least one user equipment (UE) during the access subframes of the first relay, and
to communicate, via the first relay, with a base station during the backhaul subframes of the first relay, subframe numbers of the first relay being offset at each time instance from subframe numbers of a second relay communicating with the base station, and the access subframes and the backhaul subframes of the first relay having a same subframe number as access subframes and backhaul subframes of the second relay.

21. The apparatus of claim 20, wherein the access subframes of the first relay are subframes with odd indices or subframes with even indices.

22. The apparatus of claim 20, wherein at least one of the access subframes of the first relay correspond to at least one reserved subframe of the base station, each reserved subframe having reduced transmit power in comparison to a baseline transmit power from the base station, and interference to the at least one UE communicating with the first relay being reduced in comparison to interference resulting from transmissions at the baseline transmit power.

23. The apparatus of claim 20, wherein the at least one processor is operative to configure each of the backhaul subframes of the first relay as a multicast/broadcast single frequency network (MBSFN) subframe, a blank subframe, or an almost blank subframe.

24. A computer program product, comprising:
a non-transitory computer-readable medium having program code recorded thereon, the program code comprising:
program code determine access subframes and backhaul subframes of a first relay, the access subframes and the backhaul subframes corresponding to different non-overlapping subsets of subframes of the first relay,
program code to communicate, via the first relay, with at least one user equipment (UE) during the access subframes of the first relay, and
program code to communicate, via the first relay, with a base station during the backhaul subframes of the first relay, subframe numbers of the first relay being offset at each time instance from subframe numbers of a second relay communicating with the base station, and the access subframes and the backhaul subframes of the first relay having a same subframe number as access subframes and backhaul subframes of the second relay.

25. A method for wireless communication, comprising:
determining first backhaul subframes for a first relay, the first backhaul subframes corresponding to a first subset of subframes of a base station;
determining second backhaul subframes for a second relay, the second backhaul subframes corresponding to a second subset of subframes of the base station, the first subset being different from the second subset, the first backhaul subframes having a same subframe number as the second backhaul subframes of the second relay, and subframe numbers of the first relay being offset in time from subframe numbers of the second relay at each time instance;
communicating with the first relay during the first backhaul subframes; and
communicating with the second relay during the second backhaul subframes.

26. The method of claim 25, further comprising:
selecting the first backhaul subframes from a first set of potential backhaul subframes for communicating with the base station; and
selecting the second backhaul subframes from a second set of potential backhaul subframes for communicating with the base station, wherein a superset of the first set and the second set of potential backhaul subframes for the first relay and the second relay is increased in comparison to a superset of non-offset subframes.

27. The method of claim 26, wherein the first set of potential backhaul subframes are subframes that can be configured as multicast/broadcast single frequency network (MBSFN) subframes by the first relay, and the second set of potential backhaul subframes are subframes that can be configured as MBSFN subframes by the second relay.

28. The method of claim 25, wherein a time of at least one of the first backhaul subframes for the first relay corresponds to a time of at least one access subframe of the second relay.

29. The method of claim 25, wherein the first backhaul subframes exclude subframes with odd indices or subframes with even indices of the first relay.

30. The method of claim 25, further comprising:
determining at least one reserved subframe of the base station corresponding to at least one access subframe of the first relay; and
reducing transmit power from a baseline transmit power of the base station during the at least one reserved subframe, and interference to at least one user equipment (UE) communicating with the first relay being reduced in comparison to interference resulting from transmissions at the baseline transmit power.

31. The method of claim 30, further comprising:
configuring each of the at least one reserved subframe as a multicast/broadcast single frequency network (MBSFN) subframe by the base station.

32. The method of claim 25, further comprising:
determining third backhaul subframes for a third relay, the third backhaul subframes corresponding to a third subset of the subframes of the base station, and subframes of the third relay being offset in time from the subframes of the first and second relays; and
communicating with the third relay during the third backhaul subframes.

33. The method of claim 25, further comprising:
determining a first group of relays including the first relay, the first group being associated with a first subframe offset; and
determining a second group of relays including the second relay, the second group being associated with a second subframe offset, the second subframe offset being different from the first subframe offset.

34. An apparatus for wireless communication, comprising:
means for determining first backhaul subframes for a first relay, the first backhaul subframes corresponding to a first subset of subframes of a base station;
means for determining second backhaul subframes for a second relay, the second backhaul subframes corresponding to a second subset of subframes of the base station, the first subset being different from the second subset, the first backhaul subframes having a same subframe number as the second backhaul subframes of the second relay, and subframe numbers of the first relay being offset in time from subframe numbers of the second relay at each time instance;
means for communicating with the first relay during the first backhaul subframes; and
means for communicating with the second relay during the second backhaul subframes.

35. The apparatus of claim 34, wherein the first backhaul subframes exclude subframes with odd indices or subframes with even indices of the first relay.

36. The apparatus of claim 34, further comprising:
means for determining at least one reserved subframe of the base station corresponding to at least one access subframe of the first relay; and
means for reducing transmit power from a baseline transmit power of the base station during the at least one reserved subframe, and interference to at least one user equipment (UE) communicating with the first relay being reduced in comparison to interference resulting from transmissions at the baseline transmit power.

37. An apparatus for wireless communication, comprising:
a memory unit; and
at least one processor coupled with the memory unit, the at least one processor configured:
to determine first backhaul subframes for a first relay, the first backhaul subframes corresponding to a first subset of subframes of a base station;
to determine second backhaul subframes for a second relay, the second backhaul subframes corresponding to a second subset of subframes of the base station, the first subset being different from the second subset, the first backhaul subframes having a same subframe number as the second backhaul subframes of the second relay, and subframe numbers of the first relay being offset in time from subframe numbers of the second relay at each time instance,
to communicate with the first relay during the first backhaul subframes, and
to communicate with the second relay during the second backhaul subframes.

38. The apparatus of claim 37, wherein the first backhaul subframes exclude subframes with odd indices or subframes with even indices of the first relay.

39. The apparatus of claim 37, wherein the at least one processor is configured to determine at least one reserved subframe of the base station corresponding to at least one access subframe of the first relay, and to reduce transmit power of the base station during the at least one reserved subframe to reduce transmit power from a baseline transmit power of the base station during the at least one reserved subframe, and interference to at least one user equipment (UE) communicating with the first relay being reduced in comparison to interference resulting from transmissions at the baseline transmit power.

40. A computer program product, comprising:
a non-transitory computer-readable medium having program code recorded thereon, the program code comprising:
program code to determine first backhaul subframes for a first relay, the first backhaul subframes corresponding to a first subset of subframes of a base station;
program code to determine second backhaul subframes for a second relay, the second backhaul subframes corresponding to a second subset of subframes of the base station, the first subset being different from the second subset, the first backhaul subframes having a same subframe number as the second backhaul subframes of the second relay, and subframe numbers of the first relay being offset in time from subframe numbers of the second relay at each time instance,
program code to communicate with the first relay during the first backhaul subframes, and
program code to communicate with the second relay during the second backhaul subframes.

41. A method for wireless communication, comprising:
accessing a first relay by a user equipment (UE) for communication with a base station; and
communicating with the first relay during access subframes of the first relay, the access subframes of the first relay corresponding to a first subset of subframes of the first relay, the first relay and a second relay communicating with the base station, backhaul subframes and the access subframes of the first relay having a same subframe number as backhaul subframes and access subframes of the second relay, and subframe numbers of the first relay being offset in time from subframe numbers of the second relay at each time instance.

42. The method of claim 41, further comprising:
receiving signals from the first relay during backhaul subframes of the first relay, the backhaul subframes of the first relay corresponding to a second subset of the subframes of the first relay.

43. The method of claim 42, wherein the backhaul subframes of the first relay are configured as multicast/broadcast single frequency network (MBSFN) subframes.

44. The method of claim 41, wherein the access subframes of the first relay include subframes with odd indices or subframes with even indices.

45. The method of claim 44, wherein the communicating with the first relay comprises transmitting data with hybrid automatic retransmission (HARQ) during the access subframes of the first relay.

46. The method of claim 41, wherein at least one of the access subframes of the first relay corresponds to at least one reserved subframe of the base station, and wherein the at least one reserved subframe has reduced transmit power in comparison to a baseline transmit power from the base station, and interference to at least one UE communicating with the first relay being reduced in comparison to interference resulting from transmissions at the baseline transmit power.

47. An apparatus for wireless communication, comprising:
means for accessing a first relay by a user equipment (UE) for communication and with a base station; and
means for communicating with the first relay during access subframes of the first relay, the access subframes of the first relay corresponding to a first subset of subframes of the first relay, the first relay and a second relay communicating with the base station, backhaul subframes and the access subframes of the first relay having a same subframe number as backhaul subframes and access subframes of the second relay, and subframe numbers of the first relay being offset in time from subframe numbers of the second relay at each time instance.

48. The apparatus of claim 47, wherein the access subframes of the first relay include subframes with odd indices or subframes with even indices.

49. The apparatus of claim 47, wherein at least one of the access subframes of the first relay corresponds to at least one reserved subframe of the base station, and wherein the at least one reserved subframe has reduced transmit power in comparison to a baseline transmit power from the base station, and interference to at least one UE communicating with the first relay being reduced in comparison to interference resulting from transmissions at the baseline transmit power.

50. An apparatus for wireless communication, comprising:
a memory unit; and
at least one processor coupled with the memory unit, the at least one processor configured to:
access a first relay by a user equipment (UE) for communication with a base station, and
communicate with the first relay during access subframes of the first relay, the access subframes of the first relay corresponding to a first subset of subframes of the first relay, the first relay and a second relay communicating with the base station, backhaul subframes and the access subframes of the first relay having a same subframe number as backhaul subframes and access subframes of the second relay, and subframe numbers of the first relay being offset in time from subframe numbers of the second relay at each time instance.

51. The apparatus of claim 50, wherein the access subframes of the first relay include subframes with odd indices or subframes with even indices.

52. The apparatus of claim 50, wherein at least one of the access subframes of the first relay corresponds to at least one reserved subframe of the base station, and wherein the at least one reserved subframe has reduced transmit power in comparison to a baseline transmit power from the base station, and interference to at least one UE communicating with the first relay being reduced in comparison to interference resulting from transmissions at the baseline transmit power.

53. A computer program product, comprising:
- a non-transitory computer-readable medium having program code recorded thereon, the program code comprising:
  - program code to access a first relay by a user equipment (UE) for communication between the UE and a base station, and
  - program code to communicate with the first relay during access subframes of the first relay, the access subframes of the first relay corresponding to a first subset of subframes of the first relay, the first relay and a second relay communicating with the base station, backhaul subframes and the access subframes of the first relay having a same subframe number as backhaul subframes and access subframes of the second relay, and subframe numbers of the first relay being offset in time from subframe numbers of the second relay at each time instance.

54. The method of claim 1, wherein subframe numbers of the first relay are time aligned with subframe numbers of the base station.

\* \* \* \* \*